(12) United States Patent
Van Vliet et al.

(10) Patent No.: US 12,486,977 B2
(45) Date of Patent: Dec. 2, 2025

(54) GAS BURNER AND HEATING APPLIANCE

(71) Applicant: BEKAERT COMBUSTION TECHNOLOGY B.V., Assen (NL)

(72) Inventors: Gerben Van Vliet, Assen (NL); Geert Folkers, Assen (NL); Marc Bus, Assen (NL); Parsa Tashacori, Assen (NL); Harshit Gupta, Assen (NL)

(73) Assignee: BEKAERT COMBUSTION TECHNOLOGY B.V., Assen (NL)

( * ) Notice: Subject to any disclaimer, the term of this patent is extended or adjusted under 35 U.S.C. 154(b) by 641 days.

(21) Appl. No.: 17/791,367

(22) PCT Filed: Dec. 23, 2020

(86) PCT No.: PCT/EP2020/087802
§ 371 (c)(1),
(2) Date: Jul. 7, 2022

(87) PCT Pub. No.: WO2021/140036
PCT Pub. Date: Jul. 15, 2021

(65) Prior Publication Data
US 2023/0043181 A1 Feb. 9, 2023

(30) Foreign Application Priority Data

Jan. 8, 2020 (NL) ..................................... 2024623
Nov. 9, 2020 (NL) ..................................... 2026850

(51) Int. Cl.
*F23D 14/02* (2006.01)
*F23D 14/70* (2006.01)
(Continued)

(52) U.S. Cl.
CPC ............. *F23D 14/02* (2013.01); *F23D 14/70* (2013.01); *F23D 14/84* (2013.01); *F24H 9/1836* (2013.01);
(Continued)

(58) Field of Classification Search
CPC .......... F23D 14/02; F23D 14/70; F23D 14/84; F23D 2203/1012; F23D 2203/1023; F24H 9/1836; F23C 2900/9901; F23N 1/02
(Continued)

(56) References Cited

U.S. PATENT DOCUMENTS 5,520,536 A * 5/1996 Rodgers .................. F23D 14/02
431/170
6,006,742 A   12/1999 Jamieson et al.
(Continued)

FOREIGN PATENT DOCUMENTS

EP    0 605 645    7/1994
EP    2 037 175    3/2009
(Continued)

OTHER PUBLICATIONS

International Search Report and Written Opinion of the International Searching Authority issued Feb. 26, 2021, in International (PCT) Application No. PCT/EP2020/087802.
(Continued)

*Primary Examiner* — Avinash A Savani
(74) *Attorney, Agent, or Firm* — WENDEROTH, LIND & PONACK, L.L.P.

(57) ABSTRACT

There is provided a gas burner that comprises a surface. The surface forms a burner deck comprising burner deck portions and a separation surface. The burner deck portions have holes. The separation surface is arranged to separate the burner deck portions from each other. Less than 5.0% of a surface area of the burner deck is formed by a combined surface area of the holes. The burner deck portions are adapted to define reaction zones extending over the burner deck portions. The holes are adapted to provide gas to be combusted in the reaction zones. The burner deck portions
(Continued)

Figure 1:
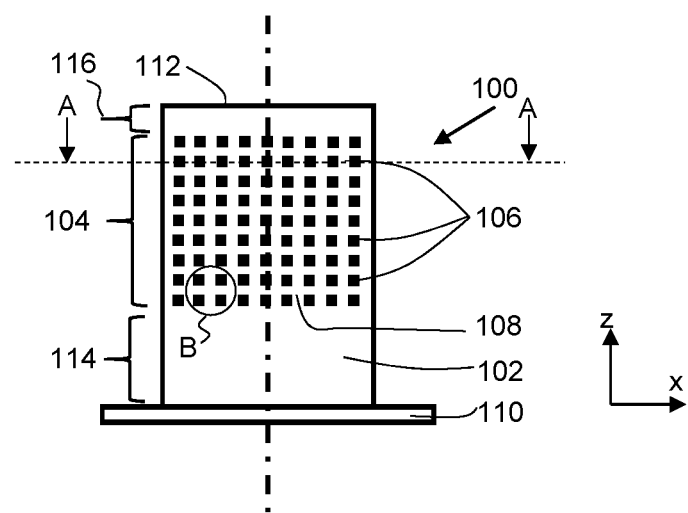

are arranged relative to each other to prevent the reaction zones from extending over the separation surface.

23 Claims, 6 Drawing Sheets

(51) Int. Cl.
    *F23D 14/84*     (2006.01)
    *F24H 9/1836*     (2022.01)
    *F23N 1/02*     (2006.01)

(52) U.S. Cl.
    CPC ............. *F23C 2900/9901* (2013.01); *F23D 2203/1012* (2013.01); *F23D 2203/1023* (2013.01); *F23N 1/02* (2013.01)

(58) Field of Classification Search
    USPC .......................................................... 431/18
    See application file for complete search history.

(56) References Cited

U.S. PATENT DOCUMENTS

| | | | | |
|---|---|---|---|---|
| 6,162,049 | A * | 12/2000 | Pellizzari | F23D 14/70 |
| | | | | 60/749 |
| 2006/0141412 | A1* | 6/2006 | Masten | F23D 14/145 |
| | | | | 431/326 |
| 2012/0193452 | A1* | 8/2012 | Ten Hoeve | F23D 14/105 |
| | | | | 239/419.5 |
| 2016/0161113 | A1* | 6/2016 | Takeuchi | F23D 14/145 |
| | | | | 431/328 |
| 2017/0314779 | A1* | 11/2017 | Wei | F23D 14/02 |
| 2018/0195717 | A1 | 7/2018 | Smelcer et al. | |
| 2019/0113228 | A1* | 4/2019 | Lamberts | F23D 14/70 |

FOREIGN PATENT DOCUMENTS

| | | |
|---|---|---|
| EP | 3 064 831 | 9/2016 |
| GB | 186203 | 9/1922 |
| WO | 93/07420 | 4/1993 |
| WO | 95/23315 | 8/1995 |
| WO | 2004/092647 | 10/2004 |
| WO | 2009/059933 | 5/2009 |
| WO | 2009/077505 | 6/2009 |
| WO | 2011/069839 | 6/2011 |

OTHER PUBLICATIONS

Search Report and Written Opinion issued Aug. 5, 2020, in corresponding Netherland Application No. 2024623.

\* cited by examiner

GAS BURNER AND HEATING APPLIANCE

The present invention relates to a gas burner, use of the gas burner and a heating appliance comprising the gas burner.

Known gas burners burn fossil gasses such as methane ($CH_4$), ethane ($C_2H_6$) and propane ($C_3H_8$) or mixtures of fossil gasses with inert gasses. Some of the known gas burners are premix burners, in which the fossil gas is mixed with air before the air-gas mixture is ignited. Premix burners have the advantage that the mass ratio and/or volume ratio of air and gas for the air-gas mixture can be set. As a result, a premix burner provides heat more efficiently than a non-premix burner.

The heat generated by the gas burner is then, for example, used to heat a building. To this end, the burner may be arranged in a heating appliance, which further comprises a heat exchanger. The heat exchanger comprises a channel that is filled with a fluid, for example water. The heat that is generated by the gas burner heats the water in the heat exchanger. This water is then circulated through the building in order to heat the building or parts thereof.

A known gas burner is described in EP 2 037 175 A2, published on Mar. 18, 2009. The known gas burner has a tubular body provided with a plurality of small through openings, slits and holes. The through openings are made along the entire side surface of the tubular body.

An air-gas-mixture enters the gas burner via an inlet opening in the head of the tubular body and exits the gas burner via the through openings. After the gas exits the through openings, the gas is burned.

The ignited gas forms a flame that is present on the outer surface of the tubular body. The flame extends over the entire outer surface of this tubular body, so the entire outer surface of the tubular body forms a burner deck of the premix burner.

The temperature of the burner deck increases significantly when the burner is operated. It is important that the burner deck does not become too hot on the inside of the tubular body. Otherwise, there is a risk that the mixture of air and gas inside the burner will ignite. This may give rise to undesirable situations.

A disadvantage of burning a fossil gas is that the carbon molecules in the gas combine with oxygen molecules to form carbon dioxide $CO_2$. Carbon dioxide is a greenhouse gas that contributes to climate change.

A way to prevent the creation of carbon dioxide is to use hydrogen ($H_2$) instead of a fossil gas. Hydrogen does not comprise carbon molecules, so no carbon dioxide is created when hydrogen is burned.

Simply providing hydrogen to the known gas burner would not be successful. One of the reasons that this would not be successful is because of a difference in flame speed. The flame speed is the rate of expansion of a flame front in a combustion reaction. The flame speed of hydrogen is between 20 and 350 cm/s, whereas the flame speed of methane is between 5 and 40 cm/s. These flame speeds depend on the mass ratio or volume ratio air/gas, further referred to as air-fuel ratio AFR. The AFR is the ratio between the mass of air $m_a$ and mass of fuel $m_f$. The ideal (theoretical) air-fuel ratio, for a complete combustion, is called the stoichiometric air-fuel ratio $AFR_{ideal}$. Combustion for burners normally works with other ratios, the so-called $AFR_{actual}$. The ratio between the actual air-fuel ratio ($AFR_{actual}$) and the ideal or stoichiometric air-fuel ratio ($AFR_{ideal}$) is called the equivalence air-fuel ratio or Lambda ($\lambda$).

$$\lambda = \frac{AFR_{actual}}{AFR_{ideal}}$$

Lambda ($\lambda$) is also called the air excess factor.

A lambda $\lambda$ of 1 indicates a mixture of air and gas for a stoichiometric combustion. A lambda $\lambda$ of less than 1 indicates a rich mixture, whereas a lambda $\lambda$ or more than 1 indicates a lean mixture. Suitable values for lambda $\lambda$ are around 1.1-1.5 for an efficient combustion in a gas burner. A lower value for lambda $\lambda$ than 1.1 will lead to a waste of gas, because not all gas is properly combusted. At such a low value for lambda $\lambda$, some gas molecules do not have enough nearby oxygen molecules to react with during the burning process. A higher value for lambda $\lambda$ than 1.5 causes inefficient heating, because a large part of the heat is absorbed by the large amount of air supplied to the gas burner. For values of lambda $\lambda$ around 1.1-1.5, the flame speed of hydrogen is about 5-10 times faster than the flame speed of methane. When using hydrogen in the known gas burner, the high flame speed causes the flame of the hydrogen to move back into the gas burner through the openings. This effect is called flash-back. Flash-back may result in an explosion that causes overheating or overpressure, leading to damage to the gas burner or other components in the heating appliance.

By providing the gas burner with a large enough flow of the air-hydrogen mixture through the openings, the combustion of the hydrogen can be stabilized on the burner deck of the gas burner. However, another property of hydrogen is that the combustion temperature is about 300° C. higher than the combustion temperature of methane. As a result, the burner deck becomes much too hot for materials typically used in gas burners. Also, when the burner deck reaches a temperature of about 585° C., hydrogen inside the gas burner may auto-ignite, causing damage to the gas burner or even an explosion. As a result, using hydrogen in gas burners has not become wide spread yet.

Another problem arises when providing hydrogen to the known gas burner. Gas burners are required to operate at several power levels. This is referred to as modulation. A gas burner should be able to work at full power when there is a high heat demand. The gas burner should also be able to work at a lower power level, for example at 50% or 25% or 20% or 10% of the maximum power level, when there is only a low heat demand. Changing the amount of flow of the air-hydrogen mixture through a known gas burner, would cause one of 3 situations: i) there is too little flow, so the flash-back occurs, ii) there is too much flow, so no stable flame is created, because the flame is pushed too far away from the burner deck, or iii) a stable flame is created on the burner deck, but the temperature becomes too high as described above.

It is the object of the invention to provide a premix gas burner that is suitable for the use of hydrogen as a combustion gas.

This object is achieved by a gas burner, comprising:
a surface forming a burner deck comprising burner deck portions and a separation surface, wherein the burner deck portions have holes,
wherein the separation surface arranged is arranged to separate the burner deck portions from each other,
wherein less than 5.0% of a surface area of the burner deck is formed by a combined surface area of the holes,
wherein the burner deck portions are adapted to define reaction zones extending over the burner deck portions, wherein the holes are adapted to provide gas to be combusted in the reaction zones, wherein the burner deck portions are arranged relatively to each other to prevent the reaction zones from extending over the separation surface.

The gas burner according to the invention, comprises a surface forming a burner deck. The burner deck has burner deck portions with holes. The surface is for example the outer surface of a tubular body. The burner deck portions are a part of this surface. The tubular body for example has an inlet opening for receiving a gas. The gas is a premixed fuel, in particular a mixture of air and hydrogen, or a mixture containing air and hydrogen. The gas burner is preferably arranged to combust hydrogen.

The surface comprises multiple burner deck portions, and each of the burner deck portions comprises at least two holes. Optionally, a burner deck portion comprises more than two holes, e.g. multiple holes that are arranged in an arrangement such as a triangle, a square, a star, a pentagon or a circle. Optionally, all burner decks portions have the same number of holes. Alternatively, not all burner deck portions have the same number of holes. Optionally, all burner deck portions which have multiple holes, have the same pattern in which the holes are arranged.

The burner deck furthermore has a separation surface arranged to separate the burner deck portions from each other. The separation surface is between adjacent burner deck portions, so the separation surface is not a burner deck portion. This separation surface is arranged between two adjacent burner deck portions to separate these two adjacent burner deck portions from each other. Optionally, the separation surface comprises multiple sub-portions which together form the separation surface. The sub-portions are for example arranged over the surface of the gas burner relative to the burner deck portions in an alternating manner. Optionally, the surface sub-portions are for example arranged over the surface of the gas burner relative to the burner deck portions in an alternating manner in a circumferential direction and/or in a longitudinal direction of the surface of the gas burner. In an embodiment, the surface of the gas burner forms a blind surface adjacent to the burner deck. The blind surface is part of the surface of the gas burner without any holes that provide gas. The blind surface connects, for example, the burner deck to an end of the gas burner. In this example, the end of the gas burner is provided with a mounting device for mounting the gas burner in a heating appliance. The blind surface is different from the separation surface, because the blind surface is not arranged between adjacent burner deck portions. Instead, the burner deck is between the burner deck and an end of the gas burner.

The burner deck portions are adapted to define reaction zones extending over the burner deck portions. Whereas, when in a known gas burner a fossil gas is burned, a flame becomes visible, no flame becomes visible when hydrogen is combusted. The flame created by the combustion of hydrogen is not visible with the human eye, unless a colorant added to the gas. Therefore, instead of referring to a flame, reference is made to a reaction zone. The reaction zone is a space in which most of the hydrogen, for example 95%, is converted into water.

The holes are adapted to provide gas, i.e. hydrogen or a mixture of air and hydrogen, to be combusted in the reaction zones. This gas is supplied to the reaction zones in the form of a gas mixture containing air and hydrogen, the air and hydrogen being mixed upstream of the gas burner. The gas is supplied to an inlet opening in the gas burner, for example, an inlet opening that is arranged in a tubular body of which the surface contains the burner deck portions. The gas then flows through the holes of the burner deck portions to the reaction zones. The burner deck portions are arranged relatively to each other so as to prevent the reaction zones from extending over the separation surface.

Less than 5.0% of a surface area of the burner deck is formed by a combined surface area of the holes. By having less than 5.0% of the surface area of the burner deck formed by the combined surface area of the holes, the gas containing the hydrogen exits the gas burner at a higher speed than if more than 5.0% of the surface area of the burner deck were formed by the combined surface area of the holes. The high speed of the gas matches the high flame speed of the gas. With less than 5.0% of the surface area of the burner deck formed by a combined surface area of the holes, experiments have shown that a stable combustion of the hydrogen can be achieved, even when modulating the gas burner, i.e. when changing the power level of the gas burner. A stable combustion is achieved even when modulating while maintaining the same lambda A. Preferably less than 4.5%, more preferably less than 4.0%, even more preferably less than 3.5% of the surface area of the burner deck is formed by a combined surface area of the holes. For example 2.6% of the surface area of the burner deck is formed by a combined surface area of the holes.

By preventing the reaction zone from extending over the separation surface, the reaction zones are separated from each other.

The gas burner according to the invention makes use of two effects. Firstly, by separating the burner decks from each other by the separation surface, the burner deck portions are extended over a smaller part of the surface than in the known gas burner. Since the burner deck portions are extended over a smaller part of the surface, the flow of the gas containing hydrogen is concentrated on this smaller part. As a result, each of the burner deck portions has a relatively large gas flow. The gas flow exits the holes of the burner deck portions at a high speed. The large flow has a cooling effect on the gas burner, because the gas burner transfers heat to the gas while the gas exits the holes. So the gas absorbs some of the heat of the gas burner before the gas is burned. The first effect is that the gas flow provides cooling of the gas burner.

The second effect is that, because the separation surface is arranged between the burner deck portions, the burner deck does not have a single burner deck portion extending over the complete burner deck. The separation surface separates the burner deck portions from each other and as a result the temperature of the burner deck portions is reduced. The combination of the first effect and second effect is that the large gas flow at the burner deck portions that are separated from each other, makes that the temperature of the gas burner stays below 585° C. and thus prevents the hydrogen inside the gas burner to auto-ignite. This provides a safe gas burner for burning hydrogen in commercial products.

It is known to provide the known gas burner with a so-called ignition group. The ignition group comprises an arrangement of holes in the burner deck that is different from the arrangement of holes in the rest of the burner deck. The ignition group forms only a small part of the burner deck, typically less than 5% or less than 3% of the surface area of the burner deck. The ignition group has a larger percentage of holes per unit area than the burner deck portions. Because of the larger percentage of holes per unit area, the ignition group receives a larger amount of gas per unit area, which allows the gas burner to start the burning process by igniting the gas at the ignition group. After the burning process has started at the ignition group, the burning process propagates to the burner deck portions. Because the ignition group only forms a small part of the burner deck, the ignition group has little to no effect on the overall temperature of the gas burner. The ignition group therefore does not form part of the burner deck portions or the separation surface.

In an embodiment, the gas burner is with a first burner deck portion, a second burner deck portion and a third burner deck portion. The first burner deck portion is separated from the second burner deck portion by separation surface in a first direction. The first burner deck portion is separated from the third burner deck portion by the separation surface in a second direction. The first burner deck portion is adjacent to the second burner deck portion and the third burner deck portion. The first direction and the second direction are different from each other, for example at an angle of 30° or 45° or perpendicular to each other. For example, the first direction is a circumferential direction of the surface and the second direction is a longitudinal direction of the surface.

In this embodiment, the first burner deck portion is separated from other burner deck portions by the separation surface on multiple sides. The first burner deck portion is not only separated from the other burner deck portions by the separation surface along a line in a single direction, but also are separated from the other burner deck portions by the separation surface along a line in another direction. This results in better cooling of the gas burner. The first burner deck portion and the second burner deck portion may be aligned relative to each other along the first direction. Alternatively, in addition to being separated in the first direction, the first burner deck portion and the second burner deck portion may be at an offset relative to each other in the second direction. Similarly, the first burner deck portion and the third burner deck portion may be aligned relative to each other along the second direction. Alternatively, in addition to being separated in the second direction, the first burner deck portion and the second burner deck portion may be at an offset relative to each other in the first direction.

In an embodiment, the first burner deck portion is separated from the second burner deck portion by the separation surface in the first direction by a first distance. The first burner deck portion is separated from the third burner deck portion by the separation surface in the second direction by a second distance. The sum of the first distance and the second distance is at least 15 mm.

Experiments by the inventors show that if the sum of the first and second distances is at least 15 mm, the gas burner is robust against flash-back. Even when changing a value for lambda A in the range of 1.1-1.35, no flash-back occurred. When there is enough distance between the first burner deck portion and the other burner deck portion, the gas burner is robust against flash-back for a range of lambda A. The first distance is defined as a distance along the surface of the burner deck. The first distance is between a first hole in the first burner deck portion and a second hole in the second burner deck. The first hole is the hole of the first burner deck portion that is closest to the second burner deck portion. The second hole is the hole of the second burner deck portion that is closest to the first burner deck portion. So the distance is the shortest distance between the holes in the two adjacent burner deck portions. The distance is measured from the center of the first hole to the center of the second hole. The second distance is defined as a distance along the surface of the burner deck. The second distance is between a third hole in the first burner deck portion and a fourth hole in the third burner deck. The third hole in the first burner deck may be the same hole as the first hole in the first burner deck. The expressions "first hole", "second hole", "third hole" and "fourth hole" a merely to indicate a hole in a certain burner deck portion to explain how the first distance and the second distance are determined. The third hole is the hole of the first burner deck portion that is closest to the third burner deck portion. The fourth hole is the hole of the third burner deck portion that is closest to the first burner deck portion. So the second distance is the shortest distance between the holes in the two adjacent burner decks. The second distance is measured from the center of the third hole to the center of the fourth hole. The sum of the values of the first distance and the second distance is 15 mm or more. In an embodiment, the first distance and the second distance are at equally large.

In an embodiment, the two adjacent burner deck portions are separated from each other by the separation surface by a distance of at least 7.5 mm, for example, at least 10 mm or 15 mm or 20 mm.

By providing the distance of at least 7.5 mm, the gas burner becomes robust against flash-back for a lambda A ranging from 1.1-1.35. The distance is defined as a distance along the surface having the burner deck portions. The distance is between a first hole in one of the adjacent burner deck portions and a second hole in the other of the adjacent burner deck portions, wherein the first hole and the second hole are closer to each other than any other hole in one of the adjacent burner deck portions to any other hole in the other of the adjacent burner deck portions. So the distance is the shortest distance between the holes in the two adjacent burner decks. The distance is measured from the center of the first hole to the center of the second hole. The center of a hole is the center of gravity of the shape of hole.

In an embodiment, the holes of the burner deck portions have a protruding edge. The protruding edge is perpendicular to the surface. For example, if the gas burner is made of sheet metal, the holes in the burner deck portions are for example made by punching holes in the sheet metal or by laser cutting holes in the sheet metal. To create the protruding edges of the holes, the edges of the holes are bent out of the plane of the sheet metal. Optionally, the edges of the holes are bent in the direction in which the gas flows during operational use of the gas burner. So the edges of the holes are closer to the reaction zones than the rest of the burner deck portions is to the reaction zones. The protruding edges may help to improve the stability of the flow of gas through the holes into the reaction zones. Alternatively, the edges of the holes are bent in the direction opposite to the direction in which the gas flows during operational use of the gas burner. In this alternative, the edges of the holes are further away from the reaction zones than the rest of the burner deck portions are from the reaction zones.

In an embodiment, each of the burner deck portions comprises a plurality of holes. Having a plurality of holes in each of the burner deck portions helps to create a stable reaction zone for each of the burner deck portions. The reaction zone extends over multiple holes. The reaction zone becomes more stable, because gas is provided to a single reaction zone via multiple holes. A deviation of the supply of gas by one of the holes, does not result in a instability of the reaction zone, because the supply of gas via the other holes keeps the reaction zone stable.

In an embodiment, the gas burner is provided wherein at least one of the plurality of holes has a different size than the other of the plurality of holes.

Experiments have shown that a stable reaction zone can be achieved by using a burner deck with holes of different sizes. From a production point of view, it may be easier to provide a burner deck with for example a few large holes and some small holes, than to only provide medium size holes. Even when providing only medium size holes, the production process may take several separate steps to prevent undesired deformation of the gas burner material. By having holes of different sizes, the production process can be optimized. The sizes, for example the diameter or the length or the width, of the holes may be in the range of 0.4-1.0 mm. A cross-section of a hole may be less than 0.78 mm$^2$. The holes may be round or may have any other suitable shape, such as rectangular, triangular or elliptical. The rectangular and triangular shape can have rounded corners. A single burner deck portion may comprise holes of different shapes, for example a rectangular hole surrounded by multiple round holes. Optionally, some or all of the holes in a single burner deck portion have a protruding edge. For example, a large hole in the center of the burner deck portion has a protruding edge, whereas smaller holes surrounding the large hole do not have a protruding edge.

In an embodiment, at least one of the holes in a burner deck portion has a diameter of 0.8 mm. A round hole with a diameter of 0.8 mm has been proven to be a useful diameter. A hole of such diameter allows for a gas flow that is able to create a stable reaction zone under common operating parameters. All holes of a burner deck portion may be round and have a diameter of 0.8 mm. All holes of all burner deck portions may have a diameter of 0.8 mm. Optionally, all holes with a diameter of 0.8 mm are provided with a protruding edge. In an embodiment, in which a hole in a burner deck portion has a non-round shape, for example rectangular or elliptical, a width or a length of the hole is 0.8 mm.

In an embodiment, the burner deck portions are arranged in a pattern, wherein the pattern is symmetrical. A symmetrical pattern of burner deck portions makes optimal use of the surface of the gas burner. Differences in temperature between the burner decks are minimized. Optionally, all holes in the symmetrical pattern of burner deck portions are provided with a protruding edge.

In an embodiment, the gas burner has a cylindrical shape and the pattern is rotational-symmetrical along a longitudinal axis of the cylindrical shape.

Cylindrical gas burners are commercially popular, because a small cylindrical gas burner of this shape can provide a large amount of heat. By applying the pattern of burner deck portions in a rotational-symmetrical manner along the axis of the cylinder shape, optimal use is made of the surface of the gas burner. The surface of the gas burner may be an outer surface of the cylindrical shape. The gas provided by the holes flows from inside the cylindrical shape to the outside of the cylindrical shape. Optionally, the edges of the holes of the burner deck portions are provided with protruding edges. In an embodiment, the protruding edges extend outward, i.e., away from the longitudinal axis of the cylindrical shape.

In an embodiment, the burner deck portions are arranged on a curved surface of the cylindrical shape. Optionally, the burner deck portions are arranged along a circumference of the cylindrical shape and separated by the separation surface.

In an embodiment, the surface has flat shape or a bowl-shape. So the gas burner is a flat-shaped gas burner or a bowl-shaped gas burner for combusting hydrogen. Alternatively, the gas burner is a line shaped gas burner that extends in a longitudinal direction. An example of a line shaped gas burner is a cigar-shaped gas burner which has the shape of a cigar that is cut in half along the longitudinal direction. In an embodiment, the cross-section of the line shaped gas burner is constant along the longitudinal direction. Alternatively, the cross-section of the line shaped gas burner along the longitudinal direction is larger in the center than at the edges along the longitudinal direction. Depending on the shape of the gas burner, the burner deck may be on an outer surface or an inner surface of the gas burner.

In an embodiment, the gas burner is provided wherein at least one of the burner deck portions comprises at least five holes, for example seven holes or nine holes or twelve holes or sixteen holes.

Experiments have shown that a gas burner with at least five holes per burner deck portion is able to create a stable reaction zone at an acceptable temperature of the gas burner under normal operating conditions of the gas burner.

In an embodiment, the gas burner is provided wherein at least one of the plurality of burner decks comprises five holes arranged in an X-arrangement. In an embodiment, the gas burner is provided wherein at least one of the plurality of burner decks comprises nine holes or sixteen holes arranged in a rectangular arrangement. In an embodiment, the holes of the burner deck portions have protruding edges.

In an embodiment, the gas burner is made of metal or ceramic or a combination of metal and ceramic. Because the temperature of the gas burner is lower during operational use compared to the known gas burner, more materials are suited for use in the gas burner according to the invention. Materials that are less resistant to high temperatures may be used.

In an embodiment, the gas burner comprises sheet metal. The sheet metal comprises the surface forming the burner deck. A dimension of at least one of the holes of the burner deck is equal to or larger than a thickness of the sheet metal.

According to this embodiment, the holes have a dimension such as a length, a width or a diameter or a diagonal. The size of at least one of the holes is equal to or larger than the thickness of the sheet metal. In known burner designs, holes with a dimension equal to or larger than the thickness of the material in which the holes are provided are prone to cause flashback. The large dimension of the hole compared to the shallow depth of the hole causes very limited resistance for the reaction zone to move through the hole in case there is a deviation in the flow of gas, therewith causing flashback. The holes would be less prone to flashback in case the holes would have been made in a material that has a much larger thickness than the size of the holes. In addition, because of the good thermal conductivity of metal and the thin thickness of the sheet metal, the sheet metal would typically be at a high temperature over the whole thickness of the sheet metal. This high temperature over the whole thickness would create a risk of auto-ignition of the gas, while the gas is inside the gas burner. Especially when the gas comprises hydrogen, the chance for auto-ignition is high, because hydrogen auto-ignites more easily and at a lower temperature than for example methane. However, the inventors have discovered that by providing the gas burner of the invention, the gas flow through the holes in the burner deck portions is sufficiently stable, even when modulating the gas burner. Due to the stable gas flow, the risk of flashback is reduced or even completely absent. In addition, by providing the burner deck with the burner deck portions and the separation surface, the burner deck remains at an acceptable low temperature.

As a result, a sheet metal can be used to form the burner deck. The sheet metal is a relatively cheap material that allows the burner deck to be formed to the desired shape easily. For example, the sheet metal has a thickness that is in the range of 0.3 mm-1.0 mm, for example 0.4 or 0.5 or 0.6 or 0.7 mm. The holes in the sheet metal have a length or a width or a diameter, for example, in the range of 0.4-1.0 mm. In an example, the diameter of a hole is equal or larger than the thickness of the sheet metal. In another example, the width or the length of a hole is equal or larger than the thickness of the sheet metal. In an example, the hole has a rectangular shape with a length and a width, preferably with rounded edges. The thickness of the sheet metal is smaller than the length and larger than the width.

In an embodiment, less than 5.0% and more than 1.0% of the surface area of the burner deck is formed by a combined surface area of the holes. If more than 1.0% of the surface area of the burner deck is formed by holes, there is enough surface through which hydrogen can flow to create a stable reaction zone. By having the surface area of the burner deck that is formed by a combined surface area of the holes in the range of 1.0%-5.0%, the reaction zone is stable and there is little risk that the combustion of the hydrogen will stop unexpectedly.

In an embodiment, the surface forms a blind surface adjacent to the burner deck. The burner deck portions comprise a first edge burner deck portion and a second edge burner deck portion. Both the first edge burner deck portion and the second edge burner deck portion are arranged adjacent to the blind surface. An arrangement of holes of the first edge burner deck portion and an arrangement of holes of the second edge burner deck portion are different from each other. The first edge burner deck portion and the second edge burner deck portion each have a plurality of holes. For example, the first edge burner deck portion has a different amount of holes than the second edge burner deck portion. For example, the first edge burner deck portion has nine holes, whereas the second edge burner deck portion has sixteen holes. Optionally, a combined surface area of the holes of the first edge burner deck portion is equal to a combined surface area of the holes of the second edge burner deck portion. For example, the second edge burner deck portion has sixteen holes, wherein each hole has a diameter of 0.80 mm. The combined surface area of the holes of the second edge burner deck portion is thus $16*0.25*\pi*(0.80)^2 = 8$ mm$^2$. In this example, the first edge burner deck portion has nine holes, wherein each hole has a diameter of 1.06 mm, so the combined surface area of the holes of the first edge burner deck portion is also $9*0.25*\pi*(1.06)^2 = 8$ mm$^2$.

During operation, the burner deck has another temperature than the blind surface, because the combustion of the gas takes place above the burner deck whereas no combustion takes place on the blind surface. The difference in temperature between the burner deck and the blind surface causes a large gradient in the temperature of the surface near or at the boundary between the blind surface and the burner deck portion. The large gradient in the temperature causes a high thermal stress in the surface near that boundary. The first and second edge burner deck portions are located near this boundary. By arranging the holes of the first and second edge burner deck portions different from each other, the thermal stress in the surface can be reduced.

In an embodiment, the holes of the first edge burner deck portion are arranged differently than the holes of a majority of the burner deck portions. The majority of the burner deck portions comprises burner deck portions which are not adjacent to the blind surface. The first edge burner deck portion and the second edge burner deck portion are arranged adjacent to the blind surface because there is no other burner deck portion between the blind surface and the first edge burner deck portion or between the blind surface and the second edge burner deck portion. For example, the first edge burner deck portion has a different amount of holes than the majority of the burner deck portions. In an example, the holes of the first edge burner deck portion is arranged in a pattern that is orientated differently from a pattern of the holes of the majority of burner deck portions. In another example, the pattern of the holes of the first edge burner deck portion is different from the pattern of the holes of the majority of burner deck portions.

In an embodiment, the holes of the first edge burner deck portion are arranged in a first rectangular arrangement. The holes of the second edge burner deck portion are arranged in a second rectangular arrangement. The first rectangular arrangement and the second rectangular arrangement are different from each other. For example, the first rectangular arrangement and the second rectangular arrangement differ from each other by the number of holes or by the layout of the holes on the surface or by the shape of the holes. The first rectangular arrangement and the second rectangular arrangement are at an angle relative to each other. The angle is, for example, in the range of 15-60°, for example in the range of 30-45°.

In an embodiment, the surface forming the burner deck comprises a surface portion with a double curvature. At least one of the first edge burner deck portion and the second edge burner deck portion is arranged on the surface portion with the double curvature. For example, the double curvature is curved in two directions with a same radius.

Even though the double curvature may be beneficial for the efficiency of the gas burner, the double curvature may cause additional thermal stress compared to a flat surface or a surface with a single curvature. The inventors have discovered that by arranging the first and second edge burner deck portions different from each other, when at least one of them is located on the double curvature, the thermal stress can be reduced.

When manufacturing the gas burner, typically first the holes are provided in a metal plate. The metal plate is then deformed to create the desired shape of the gas burner. The desired shape includes the double curvature. Holes at the double curvature may be undesirably deformed when forming the double curvature surface. For example, the holes are stretched or pinched. By arranging the holes of the first edge burner deck portion different from the holes of the second edge burner deck portion, deformation of the holes during manufacturing of the double curvature surface can be minimized.

In an embodiment, the gas burner as described above is used for combusting a gas that comprises at least 70% hydrogen. For example, the gas comprises at least 75% or 80% hydrogen. Besides hydrogen, the gas includes, for example, natural gas. Natural gas may be a combination of several different hydrocarbons such as CH4 and C2H6.

Experiments have shown that a combustible gas with 70% or more hydrogen and 30% or less other gases behaves similar to a gas of 100% hydrogen. A combustible gas with less than 20% hydrogen behaves differently than a gas of 100% hydrogen. For example, a gas mixture of hydrogen and methane with less than 20% hydrogen behaves like methane in view of burning temperature and pressure drop through the gas burner. A gas mixture of hydrogen and methane with at least 70% hydrogen behaves like hydrogen in view of flame speed, burning temperature and pressure drop. A mixture of hydrogen and methane with 20%-50% hydrogen has a behavior different from methane and different from hydrogen. Mixing hydrogen with methane already reduces the amount of carbon dioxide when this mixture is combusted compared to combusting methane without any hydrogen. For example, a mixture of 70% hydrogen and 30% methane has a carbon-dioxide reduction of about 42% compared to methane. A mixture of 80% hydrogen and 20% methane has a carbon-dioxide reduction of about 55% compared to methane. Further, 100% hydrogen is difficult to achieve, because there will likely be some contaminants left in the hydrogen gas. For safety reasons, odorants can be mixed with hydrogen to alarm people in case of a hydrogen leakage, since hydrogen does not have a smell. Combustible gasses with 90%, or 95% or 99% or 99.9% or even a higher percentage hydrogen are commercially available.

In an embodiment, there is provided a gas burner comprising a surface forming a burner deck comprising having burner deck portions and a separation surface, wherein the burner deck portions have holes, wherein the separation surface is arranged to separate the burner deck portions from each other, wherein less than 5.0% of the surface area of the burner deck is formed by a combined surface area of the holes, wherein the burner deck portions are adapted to define reaction zones extending over the burner deck portions, wherein the holes are adapted to provide gas to be combusted in the reaction zones, wherein the burner deck portions are arranged relative to each other to prevent the reaction zones from extending over the separation surface, and wherein two adjacent burner deck portions are separated from each other by the separation surface by a distance of at least 7.5 mm, for example, at least 10 mm or 15 mm or 20 mm. Optionally, the holes of the burner deck portions have a protruding edge in a direction perpendicular to the surface.

In an embodiment, there is provided a gas burner comprising a surface forming a burner deck comprising having burner deck portions and a separation surface, wherein the burner deck portions have holes, wherein the separation surface is arranged to separate the burner deck portions from each other, wherein less than 5.0% of the surface area of the burner deck is formed by a combined surface area of the holes, wherein the burner deck portions are adapted to define reaction zones extending over the burner deck portions, wherein the holes are adapted to provide gas to be combusted in the reaction zones, wherein the burner deck portions are arranged relative to each other to prevent the reaction zones from extending over the separation surface, and wherein two adjacent burner deck portions are separated from each other by the separation surface by a distance of at least 7.5 mm, for example, at least 10 mm or 15 mm or 20 mm. The plurality of burner deck portions are arranged in a pattern. The pattern is symmetrical. The gas burner has a cylindrical shape. The pattern is rotational-symmetrical along a longitudinal axis of the cylindrical shape. Optionally, the burner deck portions are arranged on a curved surface of the cylindrical shape. As a further option, the burner deck portions are separated along a circumference of the cylindrical shape by the separation surface.

In an embodiment, there is provided a gas burner comprising a surface forming a burner deck comprising having burner deck portions and a separation surface, wherein the burner deck portions have holes, wherein the separation surface is arranged to separate the burner deck portions from each other, wherein less than 5.0% of the surface area of the burner deck is formed by a combined surface area of the holes, wherein the burner deck portions are adapted to define reaction zones extending over the burner deck portions, wherein the holes are adapted to provide gas to be combusted in the reaction zones, wherein the burner deck portions are arranged relative to each other to prevent the reaction zones from extending over the separation surface. At least one of the plurality of burner deck portions comprises at least three holes, for example five holes or seven holes or nine holes or twelve holes or sixteen holes.

In an embodiment, there is provided a gas burner comprising a surface forming a burner deck comprising having burner deck portions and a separation surface, wherein the burner deck portions have holes, wherein the separation surface is arranged to separate the burner deck portions from each other, wherein less than 5.0% of the surface area of the burner deck is formed by a combined surface area of the holes, wherein the burner deck portions are adapted to define reaction zones extending over the burner deck portions, wherein the holes are adapted to provide gas to be combusted in the reaction zones, wherein the burner deck portions are arranged relative to each other to prevent the reaction zones from extending over the separation surface. Two adjacent burner deck portions are separated from each other by the separation surface by a distance of at least 7.5 mm, for example, at least 10 mm or 15 mm or 20 mm. At least one of the plurality of burner deck portions comprises at least three holes, for example five holes or seven holes or nine holes or twelve holes or sixteen holes.

In a further aspect of the invention, there is provided a heating appliance, comprising: the gas burner according to the invention, a gas inlet and an air inlet. The gas inlet is adapted to provide the gas to the burner deck portions via the holes. The air inlet is adapted to provide air to the burner deck portions via the holes.

The heat appliance receives gas containing hydrogen via the gas inlet and air via the air inlet and creates an air-gas mixture. This air-gas mixture is then sent to the holes in the burner deck portions. Burning the air-gas mixture gives a more efficient heat exchange than if only gas would be provided via the holes and air would be inserted from outside the gas burner, i.e., not via the holes. The heat appliance may be any type of heat appliance that makes use of a gas burner. For example, the heat appliance is a heating boiler to heat water. The water may be used in a central heating system to heat a building. In another example, the heat appliance in a gas heater in which the gas burner is used to heat gas, such as air.

In an embodiment, the heat appliance comprises a heat exchanger. The heat exchanger comprises a channel that is filled with a fluid, for example water. The heat that is generated by the gas burner heats the water in the heat exchanger. This water is then circulated to provide heat to a desired location or object.

In an embodiment, the heat appliance comprises a control unit arranged to control the gas inlet and/or the air inlet to control a mixture of the gas and the air before the mixture is at the burner deck portions. By controlling the gas inlet and/or the air inlet, the control unit can set the lambda $\lambda$, to match a desired power level. For low power levels, the control unit may apply a relatively high lambda $\lambda$. Although only a small amount of gas is needed for low power levels, the total amount of mass flow out of the holes should be sufficiently high to match the flame speed of the gas.

The invention also pertains to gas burner comprising a surface forming a burner deck. The burner deck comprises burner deck portions and a separation surface. The burner deck portions have holes. The separation surface is arranged to separate the burner deck portions from each other. The burner deck portions are adapted to define reaction zones extending over the burner deck portions. The holes are adapted to provide gas to be combusted in the reaction zones. The burner deck portions are arranged relative to each other to prevent the reaction zones from extending over the separation surface. The surface forms a blind surface adjacent to the burner deck. The gas burner is arranged to combust a fossil gas, such as methane, propane or butane.

In an embodiment, less than 15%, for example less than 12.0% or for example less than 10.0% of the surface area of the burner deck portions is formed by a combined surface area of the holes. More than 5.0% of the surface area of the burner deck portions is formed by a combined surface area of the holes. Less than 7.0%, for example less than 5.0% or for example less than 4.0% of the surface area of the burner deck is formed by a combined surface area of the holes. More than 1.0% of the surface area of the burner deck is formed by a combined surface area of the holes. In the prior art, gas burners for combusting a fossil gas have a much larger combined surface area of holes, such as more than 10% of the burner deck. This allows the mixture of the fossil gas and air to flow through the holes in the burner deck without much pressure drop. When combusting a fossil gas in a known gas burner, oxides of nitrogen ($NO_x$) and carbon monoxide (CO) are created. Combusting with slow cooling and appropriate λ, creates a lot of $NO_x$ and little CO, whereas operating the prior art gas burner with rapid cooling creates little $NO_x$ and a lot of CO. The inventors have discovered that by providing a combined surface area of the holes in the burner deck portions of less than 15%, but more than 5% and the combined surface area of the holes in the burner deck is less than 7.0%, preferably 6% and even more preferably less than 5.0%, but more than 1%, far less $NO_x$ is generated compared to the prior art gas burners, while the amount of CO that is generated remains at an acceptable level.

The generation of $NO_x$ has an important influence on the environment, so reducing the NOx has a positive environmental impact. By keeping the CO at an acceptable level, the gas burner is safe to use. By providing a more powerful fan, the pressure drop caused by the small combined surface area of the holes is overcome. The fan is configured to create a flow of the air-gas mixture through the gas burner.

In an embodiment, a burner deck portion is separated from an adjacent burner deck portion over a first distance in a first direction and from another adjacent burner deck portion over a second distance in a second direction. The first direction and the second direction are perpendicular to each other and define a plane parallel to the surface of the burner deck. Each of the first distance and the second distance is at least 3 mm. The sum of the first distance and the second distance is more than 6 mm and less than 16 mm, preferably more than 7 mm and less than 15 mm. So preferably 6≤x3+z2≤16 mm, or even more preferably 7≤x3+z2≤15 mm, with x3 and z2 as shown in FIGS. 3, 5, 6, 7 and 8.

By providing the burner deck portions at these distances from each other, the generation of $NO_x$ is reduced while maintaining CO at an acceptable level.

In an embodiment, multiple groups of burner deck portions are arranged. The size, shape, number of holes, for example, differ between the groups of burner deck portions. For example, multiple groups of burner deck portions are provided similar to those disclosed in PCT-application WO11069839, hereby incorporated by reference. One group of burner deck portions may comprise slots, whereas another group of burner deck portions comprises circular holes. The burner deck portions in each of the groups have less than 7.0%, for example less than 6.0% or for example less than 5.0% of the surface area of the burner deck portions formed by a combined surface area of the holes in the burner deck portions.

In an embodiment, the burner deck portions comprise a first edge burner deck portion and a second edge burner deck portion. Both the first edge burner deck portion and the second edge burner deck portion are arranged adjacent to the blind surface. The first edge burner deck portion and the second edge burner deck portion each have a plurality of holes. An arrangement of holes of the first edge burner deck portion and an arrangement of holes of the second edge burner deck portion are different from each other. For example, the first edge burner deck portion has a different amount of holes than the second edge burner deck portion. For example, the first edge burner deck portion has nine holes, whereas the second edge burner deck portion has sixteen holes. In an example, the first edge burner deck portion has a different amount of holes than the majority of the burner deck portions. In this embodiment, the first edge burner deck portion and the second edge burner deck portion are arranged adjacent to the blind surface because there is no other burner deck portion between the blind surface and the first edge burner deck portion or between the blind surface and the second edge burner deck portion. Optionally, a combined surface area of the holes of the first edge burner deck portion is equal to a combined surface area of the holes of the second edge burner deck portion. For example, the second edge burner deck portion has sixteen holes, wherein each hole has a diameter of 0.80 mm. The combined surface area of the holes of the second edge burner deck portion is thus $16*0.25*\pi*(0.80)^2=8$ mm². In this example, the first edge burner deck portion has nine holes, wherein each hole has a diameter of 1.06 mm, so the combined surface area of the holes of the first edge burner deck portion is also $9*0.25*\pi*(1.06)^2=8$ mm².

During operation, the burner deck has another temperature than the blind surface, because the combustion of the gas takes place above the burner deck whereas no combustion takes place on the blind surface. The difference in temperature between the burner deck and the blind surface causes a large gradient in temperature in the surface near or at the boundary between the blind surface and the burner deck portion. The large gradient in temperature causes a high thermal stress. The first and second edge burner deck portions are located near this boundary. By arranging the holes of the first and second edge burner deck portions different from each other, the thermal stress in the surface can be reduced.

In an embodiment, the holes of the first edge burner deck portion are arranged in a first rectangular arrangement. The holes of the second edge burner deck portion are arranged in a second rectangular arrangement. The first rectangular arrangement and the second rectangular arrangement are different from each other. For example, the first rectangular arrangement and the second rectangular arrangement differ from each other by the number of holes or by the layout of the holes on the surface or by the shape of the holes. The first rectangular arrangement and the second rectangular arrangement are, for example, at an angle relative to each other. The angle is, for example, in the range of 15-60° or 30-45°.

In an embodiment, the first rectangular arrangement and the second rectangular arrangement have the same density of holes. The length and the width of the first rectangular arrangement are in a different direction than respectively the length and the width of the second rectangular arrangement. For example, the length of the first rectangular arrangement is at an angle with the length of the second rectangular arrangement in the range of 15-60° or 30-45°.

In an embodiment, the surface forming the burner deck comprises a surface portion with a double curvature. At least one of the first edge burner deck portion and the second edge burner deck portion is arranged on the surface portion with the double curvature. For example, the double curvature is curved in two directions with a same radius. Alternatively, the double curvature is curved in two directions with different radiuses.

Even though the double curvature may be beneficial for the efficiency of the gas burner, the double curvature may cause additional thermal stress compared to a flat surface or a surface with a single curvature. The inventors have discovered that by arranging the first and second edge burner deck portions different from each other, when at least one of them is located on the double curvature, the thermal stress can be reduced.

In an embodiment, the first edge burner deck portion and the second edge burner deck portion are separated from each other by the separation surface by a distance of at least 3 mm, or at least 7.5 mm, 10 mm or 15 mm. For example, the first edge burner deck portion and the second edge burner deck portion are separated from the other burner deck portions by the separation surface by a distance of at least 3 mm, for example, at least 7.5 mm or 10 mm or 15 mm.

In an embodiment, the holes of the first edge burner deck portion and/or the second edge burner deck portion have a protruding edge protruding in a direction perpendicular to the surface.

In an embodiment, the holes first edge burner deck portion is arranged in a first triangular arrangement and wherein the holes of the second edge burner deck portion arranged in a second triangular arrangement, wherein a base of the first triangular arrangement is at an angle with a base of the second triangular arrangement. For example, the angle is in the range of 15-60° or 30-45°.

In an embodiment, the holes first edge burner deck portion is arranged in a first arrangement and wherein the holes of the second edge burner deck portion arranged in a second arrangement. The first arrangement and the second arrangement are at an angle with each other. For example, the angle is in the range of 15-60° or 30-45°. The holes may comprise one or more slots with a longitudinal direction. The longitudinal direction in the first arrangement is at the angle with the longitudinal direction in the second arrangement.

In an embodiment, there is provided a heating appliance comprising the gas burner as mentioned above. The heating appliance comprises a gas inlet adapted to provide the gas to the first edge burner deck portion and the second edge burner deck portion via the holes. The heating appliance comprises, for example, an air inlet adapted to provide air to the first and second edge burner deck portions via the holes. In an example, the heating appliance comprises a control unit adapted to control the gas inlet and/or the air inlet to control a mixture of the gas and the air before the mixture is at the first and second edge burner deck portions.

The invention will be described in more detail below under reference to the drawings, in which in a non-limiting manner exemplary embodiments of the invention will be shown. The drawings shows in FIG. 1: a gas burner according to the invention.

Figure 2:
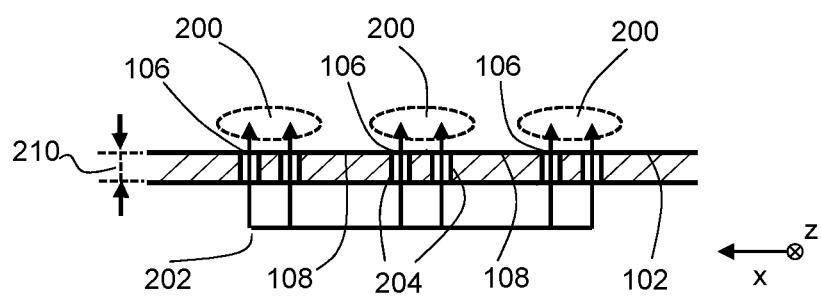

FIG. 2: a cross-section of the gas burner according to the invention.

Figure 3:
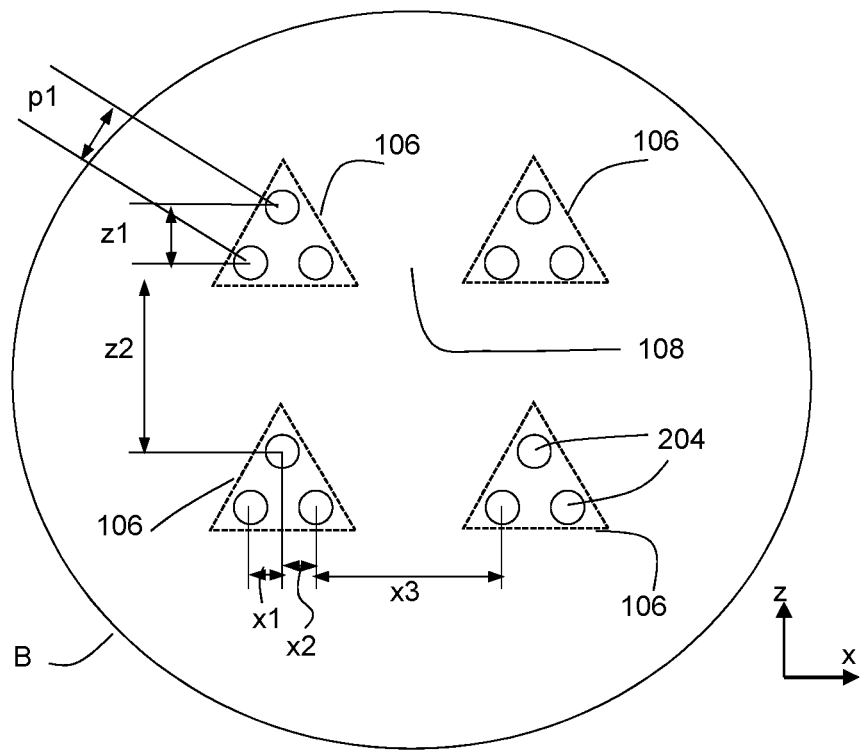

FIG. 3: a detail of a burner deck according to an embodiment of the invention.

Figure 4:
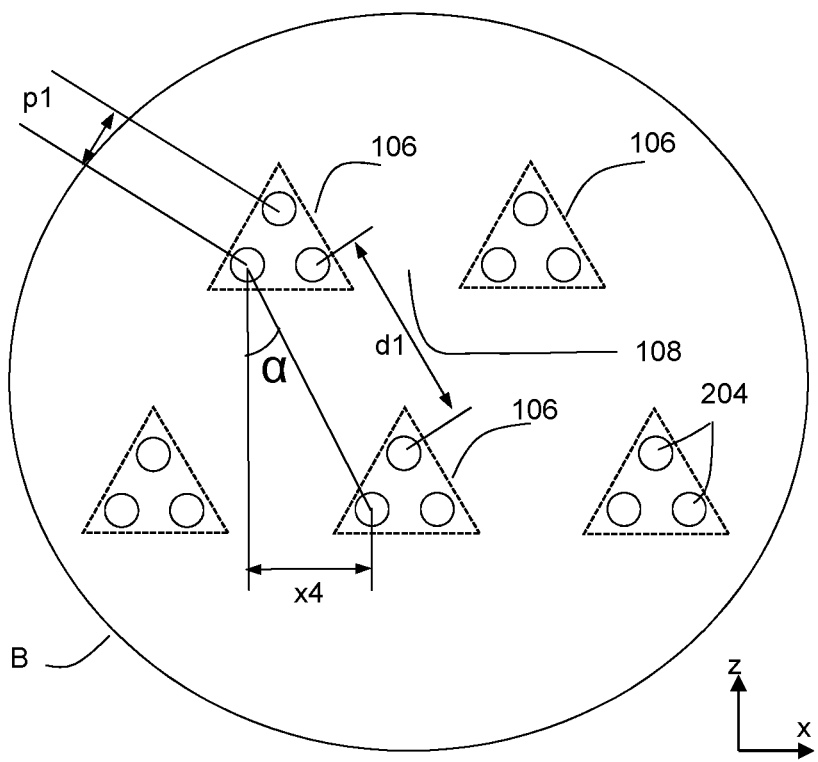

FIG. 4: a detail of a burner deck according to another embodiment of the invention.

Figure 5:
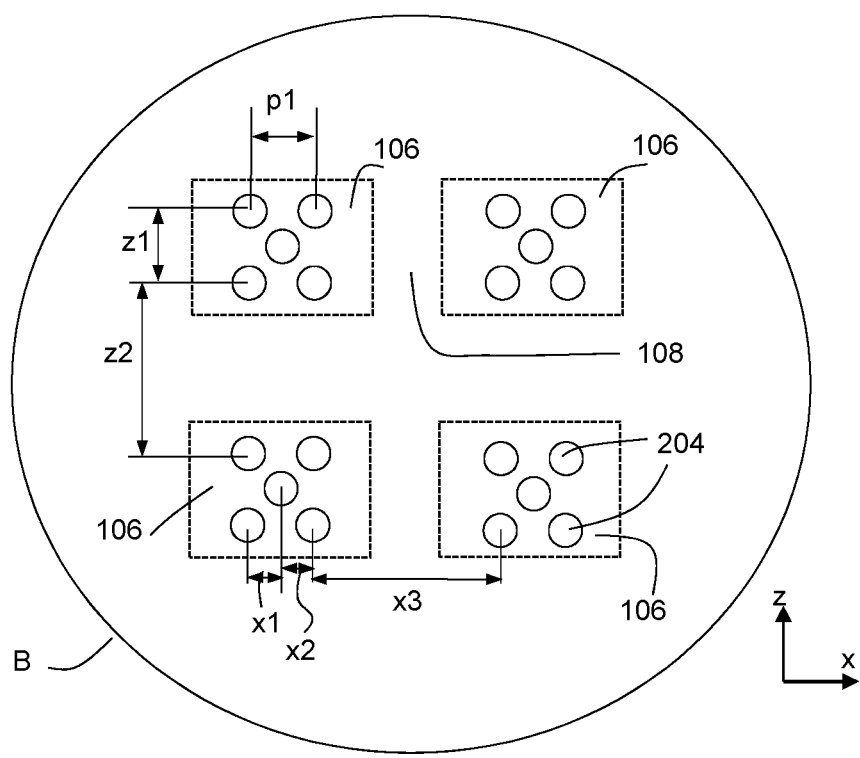

FIG. 5: a detail of a burner deck according to yet another embodiment of the invention.

Figure 6:
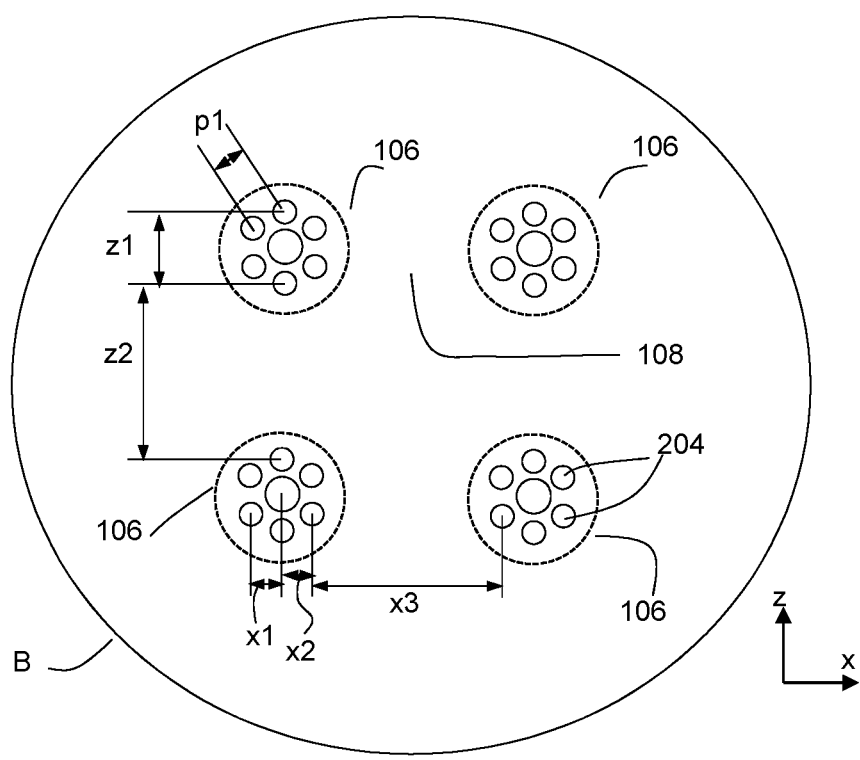

FIG. 6: a detail of a burner deck according to a further embodiment of the invention.

Figure 7:
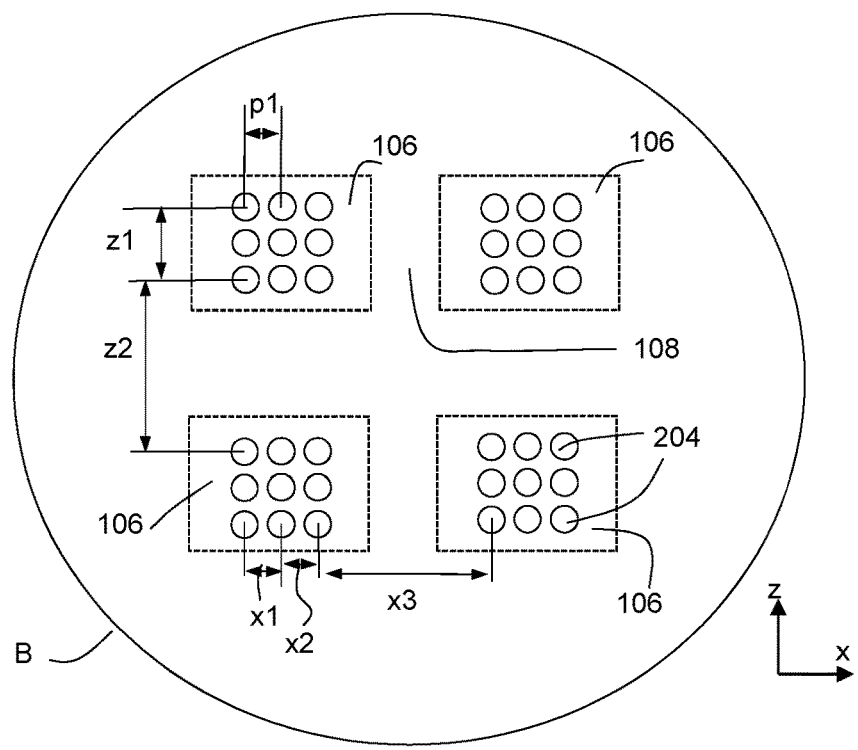

FIG. 7: a detail of a burner deck according to yet a further embodiment of the invention.

Figure 8:
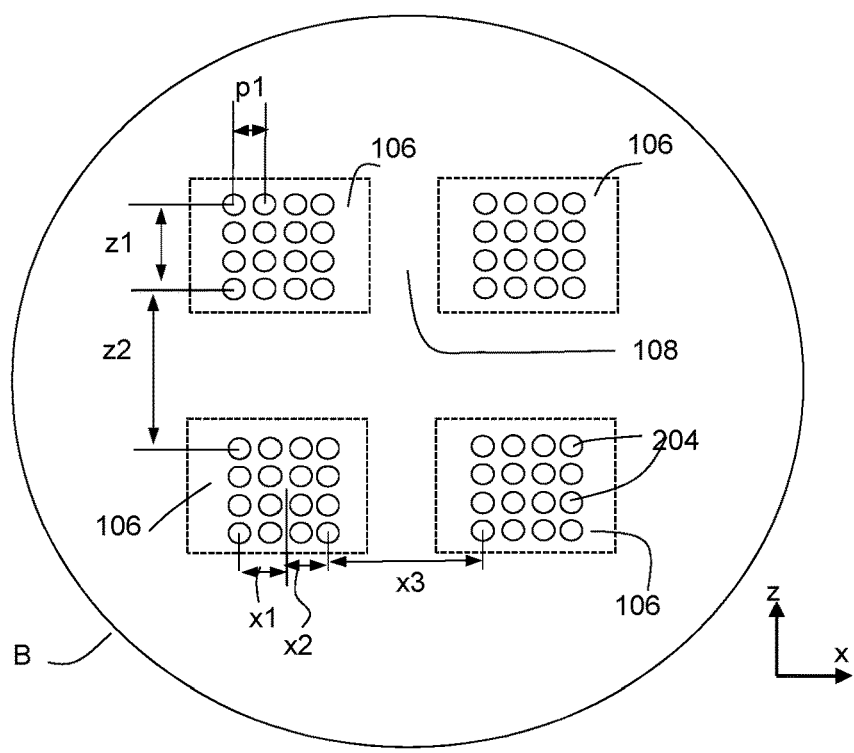

FIG. 8: a detail of a burner deck according to another embodiment of the invention.

Figure 9:
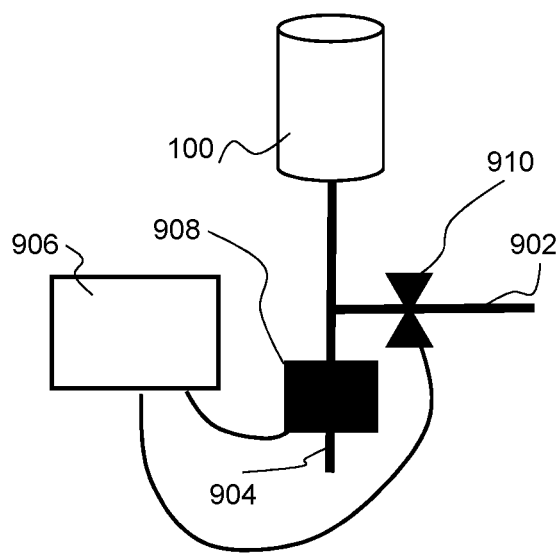

FIG. 9: a heating appliance according to the invention.

Figure 10:
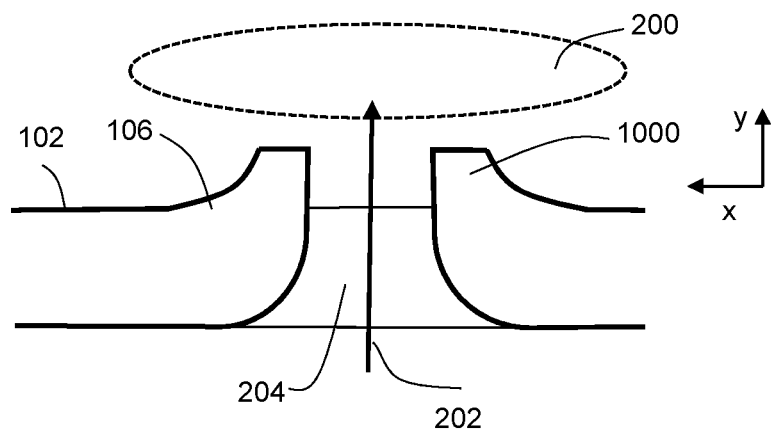

FIG. 10: a detail of a hole in a burner deck according to an embodiment of the invention.

Figure 11:
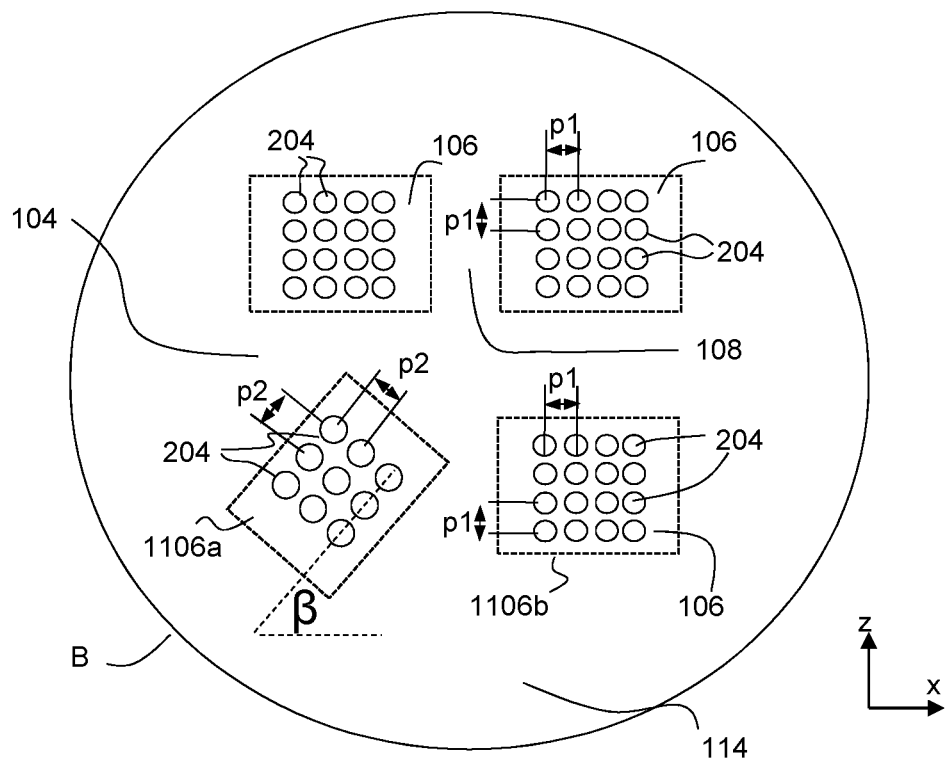

FIG. 11: a detail of a burner deck according to another further embodiment of the invention.

Figure 12:
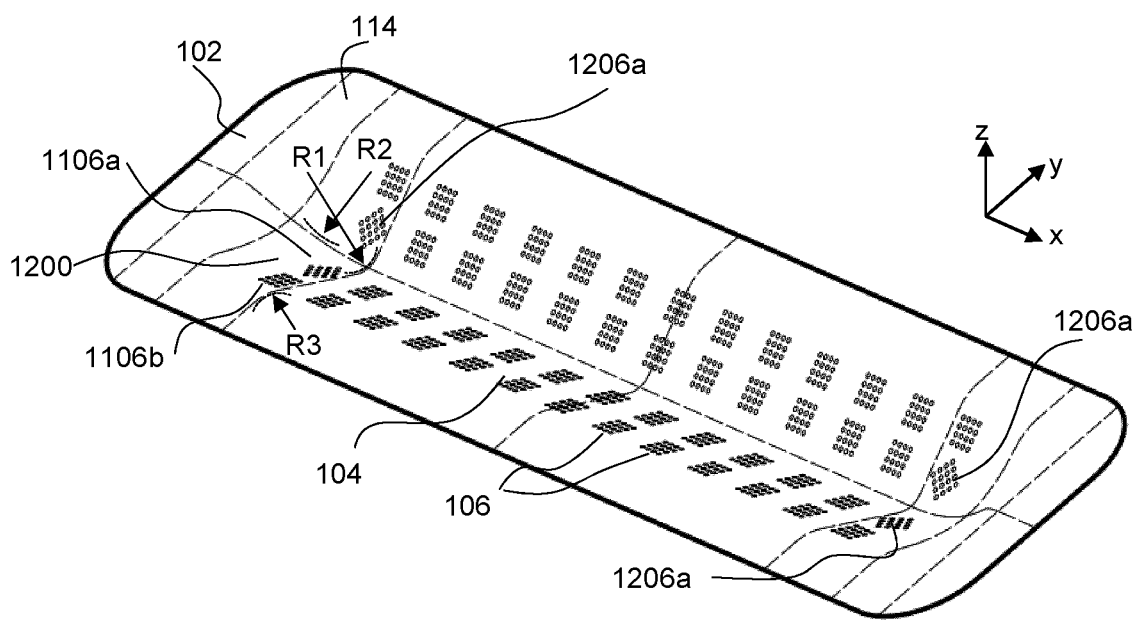

FIG. 12: a detail of a burner deck having a surface with a double curved surface according to an embodiment of the invention.

To explain the invention, use is made of a coordinate system. The coordinate system has a longitudinal axis z, and an axis x, which are perpendicular to each other.

FIG. 1 schematically depicts a gas burner 100 according to the invention. The gas burner 100 is cylindrically shaped. The outer surface of the cylinder forms surface 102. A burner deck 104 is formed on the surface 102. The burner deck 104 comprises burner deck portions 106 and a separation surface 108. The burner deck portions 106 form the surface area over which reaction zones extend. In a reaction zone the gas containing hydrogen is combusted. When burning hydrogen, no flame is visible. In case the gas burner 100 is configured to combust a fossil gas, flames would be visible during operation of the gas burner 100. FIG. 2 depicts a cross-section of the gas burner 100 of FIG. 1 along line A-A. FIG. 2 shows the invisible reaction zones 200 is that are created on the burner deck portions 106 when the gas containing hydrogen is combusted. The surface that is covered by the reaction zone 200 during operational use of the gas burner 100 forms the burner deck portions 104. The reaction zone 200 is the space in which most of the hydrogen, for example 95%, is converted into water. The separation surface 108 in between adjacent burner deck portions 106 is not covered by the reaction zones 200 during operational use of the gas burner 100.

The burner deck of gas burner 100 in FIG. 1 has multiple burner deck portions 106. The burner deck portions 106 are schematically indicated by black rectangles. The embodiments described below show different possible arrangements of the burner deck portions 106.

Part of surface 102 is in between adjacent burner deck portions 106. This part of surface 102 is referred to as separation surface 108. The separation surface 108 is arranged to separate the burner deck portions 106 from each other. During operational use of the gas burner 100, the reaction zones 200 cover the burner deck portions 106, but do not cover the separation surface 108. The burner deck portions 106 are arranged relative to each other to prevent the reaction zones 200 from extending over the separation surface 108.

In this embodiment, the gas burner 100 is provided with a flange 110 for mounting the gas burner 100. There is a distance along the surface 102 between the flange 110 and the burner deck 104. This part of the surface 102 is blind surface 114. The blind surface 114 is large enough to ensure that the burner deck 104 reaches far enough in the heating appliance, in which the gas burner 100 is used. The blind surface 114 also helps to prevent too much heat to be transferred to the flange 110. Too much heat on the flange 110 could cause thermal stress on the connection of the gas burner 100 to the heating appliance, or may provide a risk of injuring an operator operating the heating appliance, or to overheat the thermal insulation of the heating appliance. The blind surface 114 does not have holes through which gas is supplied. The reaction zones 200 do not cover the blind surface 114. Also, the blind surface 114 is not between adjacent burner deck portions 106. As shown in FIG. 1, the blind surface 114 has the burner deck portions 106 on one side and the flange 110 on the other side. Therefore, the blind surface 114 does not form part of the burner deck 104. In an embodiment, a second blind surface 116 is provided near the top 112 of the gas burner 100. The surface 102 forms the second blind surface 116 near the top 112. The second blind surface 116 helps to prevent the top 112 from overheating by separating the top 112 from the burner deck 104. Similarly to the blind surface 114, the second blind surface 116 is not covered by the reaction zones 200, nor is the second blind surface 116 between burner deck portions 106. The second blind surface 116 does not form part of the burner deck 104.

If the desired heat output of the gas burner 100 is in the range of about 10-40 kW, the cylindrical shape of the gas burner 100 has a length in the range of 90-120 mm, for example 104 mm. The length is along the longitudinal axis. The cylindrical shape may have a diameter in the range of 50-90 mm, for example 70 mm. The length of the blind surface 114 along the longitudinal z-axis may be in the range of 20-40 mm, for example 28 mm. However, for applications that require only a small power level, for example less than 1 kW, the gas burner 100 may have a length of about 25 mm and a diameter of 20 mm. For high power levels, for example 100 kW or more, the length of the gas burner 100 can be up to 2000 mm with a diameter of 500 mm. So depending on the desired power level and the available space in a heating appliance, suitable dimensions for the gas burner 100 are selected.

FIG. 1 shows a group of burner deck portions 106 as indicated by detail B. Detail B will be used to explain several embodiments of the invention by showing the arrangement of the burner deck portions 106. Any of these embodiments may be applied to the gas burner 100 as depicted in FIG. 1. Alternatively, any of these embodiments may be applied to a gas burner 100 with a different shape than a cylindrical shape. For example, the gas burner 100 is a flat gas burner or is a bowl-shaped gas burner or a line shaped gas burner or an inverted bowl-shaped gas burner. In an embodiment, the surface 102 of the gas burner 100 has a shape as disclosed in WO2004092647 or EP3064831 or WO2009059933, hereby incorporated by reference, wherein on the surface 102 the burner deck 104 according to the invention is formed.

Further, the top 112 of the cylindrical shape may be completely closed, so no gas is able to exit the gas burner 100 via the top 112. In an embodiment, the top 112 is provided with burner deck portions 106, so gas can exit the top 112 to create one or more reaction zones on the top 112. By having burner deck portions 106 provided on the top 112, gas exits the gas burner 100 not only at a circumference of the cylindrical shape, but also at the head of the cylinder shape. For example, the burner deck 104 according to the invention is applied to a gas burner with a shape as shown in WO2009/077505.

The burner deck portions 106 may be arranged rotational-symmetrically along a circumference of the cylindrical shape of the gas burner 100. The burner deck portions 106 may be aligned along the longitudinal axis of the cylindrical shape, i.e., the z-axis. Alternatively, a burner deck portion 106 may be at an offset relative to adjacent burner deck portions 106 along the longitudinal z-axis. The burner deck portions 106 may be aligned along an axis that is at an angle with the longitudinal z-axis, for example at −45°, −30°, −20°, 20°, 30° or 45°.

FIG. 2 depicts part of a cross-section of FIG. 1 along line A-A. The cross-section shows surface 102, which can be formed by a sheet of metal. The x-axis is parallel to the surface 102. In case of a cylindrically shaped gas burner 100, the sheet of metal is bent and/or rolled to create the cylindrical shape. On the opposite side of the surface 102, a flow of hydrogen 202 is provided, schematically indicated with arrows. The hydrogen 202 enters the gas burner 100 via an opening through the flange 110 and flows into an inner space of the gas burner 100. Via the inner space, the hydrogen 202 propagates through the holes 204 of the burner deck portions 106, which go through the surface 102. Where the hydrogen 202 exits the holes 204, the hydrogen 202 is ignited and several reaction zones 200 are created. The burner deck portions 106 are the part of surface 102 over which the reaction zones 200 extend. The hydrogen 202 may be mixed with air before the hydrogen 202 enters the gas burner 100 or before the hydrogen 202 exits the holes 204 of the burner deck portions 106.

The surface 102 is formed by sheet metal. The sheet metal has a thickness 210. The holes 204 extends through the entire thickness 210 of the sheet metal. In an embodiment, the thickness 210 is equal to or less than a size of the holes 204. The dimension of the holes 204 is equal to or larger than the thickness 210. The dimension of the holes 204 is a dimension of the holes 204 on the surface 102, such as a diameter or a width or a diagonal or a length.

As is visible from FIG. 2, the reaction zones 200 are separated from each other. Therefore, also the burner deck portions 106 are separate from each other. In between adjacent burner deck portions 106, there is separation surface 108. The reaction zones 200 do not extend over the separation surface 108. FIG. 2 schematically indicates that the reaction zones 200 do not touch the burner deck portions 106. However, depending on operating parameters, it is possible that the reaction zones 200 are touching the burner deck portions 106 or are partly at an end part of the holes 204 near the surface 102.

Based on the dimensions of the gas burner 100 and on the operating parameters, the size of the reaction zones 200 can be calculated. The reaction zone 200 extends beyond the holes 204 of a burner deck portion 106, so the burner deck portion 106 is larger than the surface area defined by the edges of the holes 204. For typical operating parameters, an edge of a burner deck portion 106 is half an average pitch beyond the center of the hole 204 closest to the edge of the burner deck portion 106. The average pitch is the average distance between the centers of adjacent holes in a burner deck portion 106.

In case, for example, all the holes in a burner deck portion 106 are separated from each other with a single pitch. The burner deck portion 106 in FIG. 3 is such an example. In this example, the average pitch is equal to the single pitch. The burner deck portion 106 extends half the single pitch from the center of the holes 204 at the edge of the burner deck portion 106. In an example, the holes in a burner deck portion are arranged in a more complex layout, see for example FIGS. 5 and 7. In such a complex layout, the average pitch is not equal to the pitch in the x-direction and the pitch in the z-direction. The average pitch may be bigger or smaller, depending on the layout of the holes 204. To determine the edge of the burner deck portion 106, the planar graph theory is for example used. Using the planar graph theory, lines are drawn from the center of each hole in a burner deck portion 106 to the centers of the other holes 204 in the burner deck portion 106, with the condition that none of the lines intersect each other, except at the centers of the holes 204. With this condition, each hole 204 is connected via lines to adjacent holes 204. The average distance of all lines is then determined, by the minimum of all possible drawn planar graphs. The average distance represents an average pitch. The edge of the burner deck portion is at a distance equal to half the average pitch from the center of the holes 204 nearest to the edge of the burner deck portion 106.

The total amount of surface area formed by the holes 204 on the surface 102 is referred to as the combined surface area of the holes 204. The surface area formed by the burner deck 104 is formed by the combined surface area of the burner deck portions 106 and the separation surface 108. The combined surface area of the burner deck portions 106 includes the combined surface area of the holes 204. The combined surface area of the burner deck portions 106 may include parts of the surface 102 extending beyond the edges of the holes 204 of a burner deck portion 106, depending on the dimensions of the reaction zones. Less than 5.0% of the surface area of the burner deck 104 is formed by the combined surface area of the holes 204.

The hydrogen 202 may already be mixed with air to create a desired air-gas mixture. The air-gas mixture may be created to generate a desired amount of heat when combusted in the reaction zone 200. The air-gas mixture flows through the openings 204 of the burner deck portions 106 to the reaction zones 200.

FIG. 3. shows a further embodiment according to the invention. In this embodiment, detail B shows several burner deck portions 106. Each burner deck portion 106 has three holes 204. The three holes 204 are arranged in a triangle, i.e. one hole 204 is at an offset from a line extending through the other two holes 204. The burner deck portions 106 are schematically indicated with triangles surrounding each group of three holes 204. Each of the burner deck portions 106 is separated from the other burner deck portions 106 by the separation surface 108.

The distance z1 is the distance between the center of two holes 204 in the burner deck portion along the longitudinal z-axis of the gas burner 100. Z1 may be in the range of 0.5-5 mm, for example 1 or 1.2 or 1.5 or 2.0 mm. The distance z2 is the distance along the longitudinal z-axis between the center of two adjacent holes 204 in two adjacent burner deck portions 106. Z2 may be in the range of 5.0-25 mm, for example, 6.2 or 7.5 or 10 mm. The pitch p1 between the holes is the shortest distance between two holes in a burner deck portion 106, measured from the centers of the holes. The pitch may be in the range of 0.5-5 mm, for example 1.2 or 1.5 mm or 1.8 mm. The distance x1 is the distance between the centers of two holes 204 in the burner deck portion 106 along the circumference of the cylindrically shape gas burner 100. One of the two holes 204 is in the center of the burning deck portion 106. x1 may be in the range of 0.5-2.5 mm, for example 1 or 1.2 or 1.5 or 2.0 mm. The distance x2 is the distance between the centers of two holes 204 in the burner deck portion along the circumference of the cylindrically shape gas burner 100. One of the two holes 204 is in the center of the burning deck portion 106. x2 may be in the range of 0.5-2.5 mm, for example 1 or 1.2 or 1.5 or 2.0 mm. x1 may be the same as x2, or may be different from x2. The distance x3 is the distance between the center of two adjacent holes 204 in two adjacent burner deck portions 106 along the x-direction along the circumference of the cylindrically shape gas burner 100. x3 may be in the range of 7-25 mm, for example, 7.7 or 10.3 or 11.3 mm. In an embodiment, z1 is 1.2 mm, z2 is 6.2 mm, x1 is 0.7 mm, x2 is 0.7 mm and x3 is 6.3 mm, wherein the diameter of the holes 204 is 0.8 mm.

FIG. 3 shows that the top left burner deck portion 106 is separated from the top right burner deck portion 106 by the separation surface 108 in the x-direction with a first distance. The x-direction is along the circumference of the cylindrically shape gas burner 100. The first distance may be equal to x3 minus the size of the holes 204. The first distance may be smaller than x3 minus the size of the holes 204 in case the reaction zones 200 extend beyond the holes 204 of the burner deck portions 106. FIG. 3 shows that the top left burner deck portion 106 is separated from the bottom left burner deck portion 106 by the separation portion 108 in the longitudinal z-direction with a second distance. The second distance may be equal to z2 minus the size of the holes 204. The second distance may be less than z2 minus the size of the holes 204 in case the reaction zones 200 extend beyond the holes 204 of the burner deck portions 106.

The burner deck portion 106 extends in the positive direction of the longitudinal z-axis with half the value of the pitch p1 from the upper hole 106. The burner deck portion 106 extends in the negative direction of the longitudinal z-axis with half the pitch p1 from the two lower holes 106. The burner deck portion 106 extends in the positive circumferential direction with half the value of the pitch p1 from the right lower hole 106. The burner deck portion 106 extends in the negative circumferential direction with half the value of the pitch p1 from the left lower hole 106.

FIG. 4 shows a variation on the embodiment of FIG. 3. Instead of arranging the burner deck portions 106 aligned along the longitudinal z-axis, the burner decks portions 106 are at an offset x4 in the x-direction, i.e., along a circumference of the cylindrically shaped gas burner 100. The offset x4 may be half the value of x3, for example 3.15 mm, or a quarter of the value of x3 or a fifth of the value of x3. Similarly, instead of arranging the burner deck portions 106 aligned along the circumferential direction, i.e., x-axis, the burner deck portions 106 may be arranged at an offset in the longitudinal z-direction. The top left burner deck portion 106 is at an angle α with the bottom center burner deck portion 106. The angle α is for example 30° or 45° or 60°. Along the longitudinal axis, the burner deck portions 106 are aligned relative to each other with the angle α. The shortest distance between a hole in the left upper burner deck portion 106 and the middle lower burner deck portion 106 is distance d1.

FIG. 5 shows a further embodiment. Detail B shows burner deck portions 106 that each have five holes 204. The holes 204 are arranged in an X-arrangement, i.e., four holes 204 forming the corners of a rectangle with the fifth hole in the center of the rectangle. Optionally, the rectangle is a square. The values for z1, z2, x1, x2, x3 may be same as described in the embodiment in FIG. 3. The pitch p1 is the distance between the centers of the two upper holes of a burner deck portion 106. In an embodiment, z1 is 2 mm, z2 is 7.5 mm, x1 is 1 mm, x2 is 1 mm and x3 is 8.3 mm, wherein the holes have a diameter of 0.8 mm.

As an example the average pitch of FIG. 5 is determined. There are five holes 204 in a burner deck portion 106. Four lines can be drawn between the four holes 204 that form a rectangle. Two of these lines have a length of p1, and the two other lines have a length z1. Further, four diagonal lines can be drawn from the hole 204 in the center of the burner deck portion 204 to the four holes 204 forming the rectangle.

The length of the diagonal line is $\sqrt{((0.5*p1)^2+(0.5*z1)^2)}$.

With p1 is 2 mm and z1 is 2 mm, the average pitch becomes:

(2*2 mm+2*2 mm+4*√2)/8=1.71 mm

The burner deck portion 106 extends half the average pitch, i.e., 0.85 mm, from the centers of the holes 204 forming the rectangle. In this example, the average pitch of 1.71 mm is smaller than the pitch p1 of 2 mm and than z1 of 2 mm.

The burner deck portion 106 extends in the positive direction of the longitudinal z-axis with half the value of the average pitch. The burner deck portion 106 extends in the negative direction of the longitudinal z-axis with half the value of the average pitch from the two lower holes 106. The burner deck portion 106 extends in the positive circumferential direction with half the value of the average pitch from the two right lower holes 106. The burner deck portion 106 extends in the negative circumferential direction with half the value of the average pitch from the two left lower holes 106.

FIG. 6 shows yet another embodiment. Detail B of FIG. 6 shows burner deck portions 106 that each have seven holes 204. The holes 204 are arranged with a larger hole in the center, surrounded by six smaller holes 204. The larger hole may have a diameter of for example 1.0 mm, whereas the surrounding six holes 204 have diameter of for example 0.8 mm. The values for z1, z2, x1, x2, x3, may be same as described in the embodiment in FIG. 3. The pitch p1 is the distance between two adjacent holes in a burner deck portion 106. In an embodiment, z1 is 3 mm, z2 is 10 mm, x1 is 1.3 mm, x2 is 1.3 mm and x3 is 8.7 mm. The burner deck portion 106 is substantially circular with a diameter of 3 times the pitch p1.

FIG. 7 shows yet a further embodiment. Detail B of FIG. 7 shows burner deck portions 106 that each have nine holes 204. The holes 204 are arranged in a 3×3 formation, i.e. in a rectangular arrangement. In the rectangular arrangement, three groups of three holes 204 are defined. The holes 204 of each group is aligned along the longitudinal z-axis. The three groups are arranged at the same position on the longitudinal z-axis at a different position on the circumference of the gas burner 100. The rectangular arrangement may be square, i.e., a distance between the holes 204 with in a group is the same as a distance between the holes in adjacent groups. The values for z1, z2, x1, x2, x3 may be same as described in the embodiment in FIG. 3. The pitch p1 is the distance between two adjacent holes. In an embodiment, z1 is 2.6 mm, z2 is 10.5 mm, x1 is 1.3 mm, x2 is 1.3 mm, x3 is 10.8 mm, wherein the diameter of the holes 204 is 0.8 mm. In another embodiment, z1 is 2.2 mm, z2 is 5.2 mm, x1 is 1.1 mm, x2 is 1.1 mm and x3 is 5 mm, wherein the diameter of the holes is 0.45 mm.

The planar graph theory can be used to determine the edge of the burner deck portion 106. All the nine holes in a burner deck portion 106 can be connected with 16 lines. 6 Lines are in the x-direction and have a length of p1. 6 Lines are in the z-direction and have a length of 0.5*z1. There are 4 diagonal lines with length $\sqrt{((p1)^2+(0.5*z1)^2)}$. For p1=1.3 and z1=2.2, the average pitch becomes:

(6*1.3+6*1.1+4*1.70)/16=1.33 mm

The average pitch of 1.33 mm is somewhat larger than the pitch p1 and than half of z1.

The burner deck portion 106 extends in the positive direction of the longitudinal z-axis with a value of half the average pitch, which slightly larger than half the value of the pitch p1 from the upper holes 106. The burner deck portion 106 extends in the negative direction of the longitudinal z-axis with half the value of the average pitch from the lower holes 106. The burner deck portion 106 extends in the positive circumferential direction with half the value of the average pitch from the holes 106 on the right. The burner deck portion 106 extends in the negative circumferential direction with half the value of the average pitch.

In an embodiment, the burner deck portion 106 has 13 holes. Four holes are in the center of the burner deck portion 106, and nine holes surround the four holes in the center.

FIG. 8 shows another further embodiment. Detail B of FIG. 8 shows burner deck portions 106 that each have sixteen holes 204. The holes 204 are arranged in a 4×4 formation, i.e. in a rectangular arrangement. In the rectangular arrangement, four groups of four holes 204 are defined. The holes 204 of each group is aligned along the longitudinal z-axis. The four groups are arranged at the same position on the longitudinal z-axis at a different position on the circumference of the gas burner 100. The rectangular arrangement may be square, i.e., a distance between the holes 204 with in a group is the same as a distance between the holes in adjacent groups. The values for z1, z2, x1, x2, x3 may be same as described in the embodiment in FIG. 3. The pitch p1 is the distance between two adjacent holes. In an embodiment, z1 is 3 mm, z2 is 5.2 mm, x1 is 1.5 mm, x2 is 1.5 mm, and x3 is 6 mm, wherein the diameter of the holes is 0.4 mm. The burner deck portion 106 extends in the positive direction of the longitudinal z-axis with half the value of the average pitch for this arrangement of the holes 204. The burner deck portion 106 extends in the negative direction of the longitudinal z-axis with half the value of the average pitch from the lower holes 106. The burner deck portion 106 extends in the positive circumferential direction with half the value of the average pitch from the holes 106 on the right. The burner deck portion 106 extends in the negative circumferential direction with half the value of the average pitch.

In this embodiment, the gas burner 100 comprises a combination of the burner deck portions 106 as disclosed in the embodiments of FIGS. 3-8. For example, the gas burner 100 comprises several burner deck portions 106 according to FIG. 3 and in addition several burner deck portions 106 according to FIG. 5. In an embodiment, each burner deck portion 106 is at an offset in the x-direction and in the z-direction with adjacent burner deck portions 106.

The offset is for example in the range of 1-10 mm.

When using a punch to provide the holes in the metal sheet during the manufacturing of the gas burner 100, it is beneficial to have the same pitch p1 between all holes in a burner deck portions 106 and in all burner deck portions. This way, a single punch is able to form all the holes. However, variations of the pitch p1 within a burner deck portion 106 or between burner deck portions 106 are possible. For example, when applying laser cutting to provide the holes in the metal sheet, the laser cutting apparatus can be programmed to provide the holes with a variation of the pitch p1. A variation of the pitch p1 may help to reduce noise produced by the gas burner 100 in operational use.

FIG. 9 shows a heating appliance according to the invention. The heating appliance comprises the gas burner 100. A supply line is provided to supply air and hydrogen to the gas burner 100. The amount of hydrogen to the gas burner 100 is set by a valve 910 on the gas inlet 902. The amount of air to the gas burner 100 is determined by the rotation speed of a fan 908 at the air inlet 904. A control unit 906 controls the valve 910 on the gas inlet 902 and the fan 908 at the air inlet 904. For example, the control unit 906 provides a control signal to an actuator that is adapted to open and close the valve 910 on the gas inlet 902. The control unit 906 is adapted to control the rotation speed of the fan 908 to control the amount of air that is supplied to the gas burner 100. The control unit 906 is adapted to provide the control signal in response to an input signal. The input signal may be representative of a desired power level of the gas burner 100 or a desired temperature or a desired status of the gas burner 100.

FIG. 10 shows an embodiment of a hole 204, that can be applied to any of the burner deck portions 106 described above. The hole 204 has a protruding edge 1000 that extends above the main surface of the surface 102. The protruding edge 1000 protrudes in a direction perpendicular to the surface 102. The protruding edge 1000 may help to improve the flow of hydrogen 202 exiting the hole 204, as the hydrogen 202 can flow through the hole 204 without being disturbed by any sharp edges that may be present at the boundaries of the hole. In FIG. 10, the protruding edge 1000 protrudes in the direction of the reaction zone 200. Alternatively, the protruding edge 1000 protrudes in the opposite direction, i.e., away from the reaction zone 200.

The embodiments above describe the gas burner 100 as implemented as a gas burner configured to combust hydrogen. These embodiments are similar to the case that the gas burner 100 is configured to combust a fossil gas, except for the following. Less than 15.0%, for example less than 12.0% or for example less than 10.0% of the surface area of the burner deck portions 106 is formed by a combined surface area of the holes 204. More than 5.0% of the surface area of the burner deck portions 106 is formed by a combined surface area of the holes 204. Less than 7.0%, for example less than 5.0% or for example less than 3.0% of the surface area of the burner deck 104 is formed by a combined surface area of the holes 204. More than 1.0% of the surface area of the burner deck 104 is formed by a combined surface area of the holes 204.

FIG. 11 shows yet another embodiment of the detail B according to the invention. In this embodiment, the gas burner 100 comprises a surface 102 forming a burner deck 104. The burner deck 104 comprises burner deck portions 106 and the separation surface 108. The burner deck portions 106 have holes 204. The separation surface 108 is arranged to separate the burner deck portions 106 from each other. The burner deck portions 106 are adapted to define reaction zones 200 extending over the burner deck portions 106. The holes 204 are adapted to provide gas 202 to be combusted in the reaction zones 200. The burner deck portions 106 are arranged relative to each other to prevent the reaction zones 200 from extending over the separation surface 108. The surface 102 forms a blind surface 114 adjacent to the burner deck 104. The burner deck portions 106 comprise a first edge burner deck portion 1106a and a second edge burner deck portion 1106b. Both the first edge burner deck portion 1106a and the second edge burner deck portion 1106b are arranged adjacent to the blind surface 114. An arrangement of holes 204 of the first edge burner deck portion 1106a and an arrangement of holes 204 of the second edge burner deck portion 1106b are different from each other. The first edge burner deck portion 1106a has a different amount of holes than the second edge burner deck portion 1106b. The first edge burner deck portion 1106a has nine holes, whereas the second edge burner deck portion 1106b has sixteen holes. As shown in the figure, the first edge burner deck portion 1106a has a different amount of holes 204 than the majority of the burner deck portions 106 and 1106b. The majority of the burner deck portions 106 and 1106b have sixteen holes 204. The first edge burner deck portion 1106a and the second edge burner deck portion 1106b are arranged adjacent to the blind surface since there is no other burner deck portion 106 between the blind surface 114 and the first edge burner deck portion 1106a or between the blind surface 114 and the second edge burner deck portion 1106b. The first and second edge burner deck portions 1106a, 1106b are the closer to the blind surface 114 than the other burner deck portions 106. Optionally, a combined surface area of the holes 204 of the first edge burner deck portion 1106a is equal to a combined surface area of the holes 204 of the second edge burner deck portion 1106b. So the combined surface area of the nine holes 204 of the first edge burner deck portion 1106a equals or is substantially equal to the combined surface area of the sixteen holes of the second edge burner deck portion 1106b.

In the embodiment of FIG. 11, the holes 204 of the first edge burner deck portion 1106a are arranged in a first rectangular arrangement. The holes 204 of the second edge burner deck portion 1106b are arranged in a second rectangular arrangement. The first rectangular arrangement and the second rectangular arrangement are different from each other. The first rectangular arrangement and the second rectangular arrangement differ from each other by the number of holes 204 and by the layout of the holes 204 on the surface 102. The first rectangular arrangement and the second rectangular arrangement are at an angle $\beta$ relative to each other. The angle $\beta$ is 45°. As shown in the figure, the length of the second rectangular arrangement of the second edge burner deck portion 1106b is parallel to the x-direction. The length of the first rectangular arrangement of the first edge burner deck portion 1106a is at the angle $\beta$ with the x-direction.

In the first rectangular arrangement of the holes 204 of the first edge burner deck portion 1106a are spaced apart from each other with pitch p2. The holes 204 in the first rectangular arrangement are arranged in three rows that are spaced from each other with pitch p2, and in three columns that are spaced from each other with pitch p2. In an example, the rows are spaced differently from each other than the columns are spaced from each other. In the second rectangular arrangement of the holes 204 of the second edge burner deck portion 1106b are spaced apart from each other with pitch p1. The holes 204 in the second rectangular arrangement are arranged in three rows that are spaced from each other with pitch p1, and in three columns that are spaced from each other with pitch p1. In an example, the rows are spaced differently from each other than the columns are spaced from each other.

The holes 204 of the burner deck portions 106 are arranged according to the same second rectangular arrangement as the holes 204 of the second edge burner deck portion 1106b.

In the embodiment of FIG. 11, the burner deck 104 is arranged for a gas burner 100 to combust hydrogen. For the combustion of hydrogen, the combined surface of the holes 204 form less than 5.0% of the surface area of the burner deck 104 to prevent flash-back. In another embodiment, the burner deck 104 of FIG. 11 is used in a gas burner to burn a fossil gas, such as methane or propane.

FIG. 12 discloses a detail of a burner deck 104 having a double curved surface according to an embodiment of the invention. Instead of the cylindrically shaped gas burner of previous embodiments, the surface 102 here forms a line shaped gas burner with curved surfaces. The line shaped gas burner extends in the x-direction. The line shaped gas burner has a cross-section in the yz-plane that resembles a rounded pyramid shape. Alternatively, the line shaped gas burner has a cross-section in the yz-plane that is half-circular or triangular or parabolic. In an example, the size of the cross-section of the line shaped gas burner is smaller near the ends of the longitudinal direction than in the center along the longitudinal direction. The surface 102 has a burner deck 104 and a blind surface 114. The blind surface 114 forms a flange around the burner deck 104. The flange is arranged to mount the gas burner 100 in a heating appliance. The burner deck 104 extends out of the plane as defined by the blind surface 114. The burner deck 104 has, for example, a cross-section along the y-direction in the shape of a circle-segment, a triangle, a triangle with rounded edges, a parabola or a hyperbola. The longitudinal direction of the burner deck 104 is along the x-direction.

The surface 102 forms the burner deck 104 and comprises a surface portion 1200 with a double curvature.

In operational use, the gas flows from the concave side of the surface 102 through the holes 204 of the burner deck portions 106 to the convex side of the surface 102. The reaction zones 200 are created on the convex side of the surface 102. FIG. 12 depicts a view on the concave side of the surface 102.

The first edge burner deck portion 1106a and the second edge burner deck portion 1106b are arranged on the surface portion 1200 with the double curvature. The surface portion 1200 has a curvature with a radius R1 in the yz-plane, a curvature with radius R2 in the xz-plane and another curvature with radius R3 in the yz-plane. In this example, radius R1 is equal to radius R3, and radius R2 is different from radiuses R1 and R3. In another example, all of radiuses R1, R2 and R3 are different from each other. In yet another example, all of the radius R1, R2 and R3 are the same.

The surface portion 1200 forms part of the burner deck 104 and forms part of the blind surface 114. Alternatively, the surface portion 1200 does not form part of the blind surface 114 and forms only part or all of the burner deck 104.

The first edge burner deck portion 1106a is on the surface portion 1200 curved by radiuses R1 and R2. The second edge burner deck portion 1106b is on the surface portion 1200 curved by radiuses R2 and R3.

The holes 204 of the burner deck portions 106 are dimensioned for the gas that is to be combusted. For example, for the combustion of hydrogen, the combined surface of the holes 204 forms less than 5.0% of the surface area of the burner deck 104 to prevent flash-back. In the embodiment that the gas burner is configured for burning a fossil gas, the combined surface of the holes 204 that is less than 7.0% of the surface of the burner deck. And the combined surface of the of the holes 204 of one portion is between 5% and 15% of the surface of the burner deck portion.

FIG. 12 shows that the first edge burner deck portion 1106a is under an angle of 45° with the second edge burner deck portion 1106b. Because of the symmetrical design of the gas burner, there are three additional edge burner portions 1206a arranged on the surface 102. The three additional edge burner portions 1206a are, just as the first edge burner deck portion 1106a, arranged under an angle of 45° with the other burner deck portions 106.

As required, this document describes detailed embodiments of the present invention. However it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average skilled person.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" are constitute open language and do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

The invention claimed is:

1. A gas burner (100), comprising:
   a surface (102) forming a burner deck (104) comprising burner deck portions (106) and a separation surface (108),
   wherein the burner deck portions (106) have holes (204),
   wherein the separation surface (108) is arranged to separate the burner deck portions (106) from each other,
   wherein less than 5.0% of a surface area of the burner deck (104) is formed by a combined surface area of the holes (204),
   wherein the burner deck portions (106) are adapted to define reaction zones (200) extending over the burner deck portions (106),
   wherein each of the burner deck portions (106) comprises a plurality of holes (204),
   wherein the holes (204) have a diameter or a length or a width in the range of 0.4-1.0 mm,
   wherein the holes (204) are adapted to provide gas (202) to be combusted in the reaction zones (200),
   wherein the burner deck portions (106) are arranged relative to each other to prevent the reaction zones (200) from extending over the separation surface, and
   wherein the burner deck portions (106) comprise a first burner deck portion, a second burner deck portion and a third burner deck portion, wherein the first burner deck portion is separated from the second burner deck portion by the separation surface (108) in a first direction (z), wherein the first burner deck portion is separated from the third burner deck portion by the separation surface in a second direction (x), wherein the first burner deck portion is adjacent to the second burner deck portion and the third burner deck portion, wherein the first direction (z) and the second direction (x) are different from each other.

2. The gas burner (100) according to claim 1, wherein the first burner deck portion is separated from the second burner deck portion by the separation surface (108) in the first direction by a first distance (z2), wherein the first burner deck is separated from the third burner deck portion by the separation surface (108) in the second direction with a second distance (x3), wherein the sum of the first distance and the second distance is at least 15 mm.

3. The gas burner (100) according to claim 1, wherein two adjacent burner deck portions (106) are separated from each other by the separation surface (108) by a distance of at least 7.5 mm.

4. The gas burner (100) according to claim 1, wherein the holes (204) have a protruding edge (1000) protruding in a direction perpendicular to the surface (102).

5. The gas burner (100) according to claim 1, wherein at least one of the holes (204) has a different size than the other holes (204).

6. The gas burner (100) according to claim 1, wherein at least one of the holes (204) has a diameter of 0.8 mm.

7. The gas burner (100) according to claim 1, wherein the plurality of burner deck portions (106) are arranged in a pattern, wherein the pattern is symmetrical.

8. The gas burner (100) according to claim 7, having a cylindrical shape and wherein the pattern is rotational-symmetrical along an a longitudinal axis of the cylindrical shape.

9. The gas burner (100) according to claim 1, having a cylindrical shape and wherein the burner deck portions (106) are arranged on a curved surface of the cylindrical shape.

10. The gas burner (100) according to claim 9, wherein the burner deck portions (106) are arranged along a circumference of the cylindrical shape and separated from each other by the separation surface (108).

11. The gas burner (100) according to claim 1, wherein the surface has one of a flat shape and a bowl-shape.

12. The gas burner (100) according to claim 1, wherein at least one of the burner deck portions (106) comprises at least three holes (204).

13. The gas burner (100) according to claim 1, wherein at least one of the burner deck portions (106) comprises five holes (204) arranged in an X-arrangement.

14. The gas burner (100) according to claim 1, wherein at least one of the plurality of burner deck portions (106) comprises nine holes (204) or sixteen holes (204) arranged in a rectangular arrangement.

15. The gas burner (100) according to claim 1, wherein the surface (102) forms a blind surface (114) adjacent to the burner deck (104), wherein the burner deck portions (106) comprise a first edge burner deck portion (1106a) and a second edge burner deck portion (1106b), wherein both the first edge burner deck portion (1106a) and the second edge burner deck portion (1106b) are arranged adjacent to the blind surface (114), wherein an arrangement of holes (204) of the first edge burner deck portion (1106a) and an arrangement of holes of the second edge burner deck portion (1106b) are different from each other.

16. The gas burner (100) of claim 15, wherein the holes of the first edge burner deck portion (1106a) are arranged differently than the holes of a majority of the burner deck portions (106).

17. The gas burner (100) of claim 15, wherein the holes (204) of the first edge burner deck portion (1106a) are arranged in a first rectangular arrangement, wherein the holes (204) of the second edge burner deck portion (1106b) are arranged in a second rectangular arrangement, wherein the first rectangular arrangement and the second rectangular arrangement are different from each other.

18. The gas burner (100) of claim 15, wherein the surface (102) forming the burner deck (104) comprises a surface portion (1200) with a double curvature, wherein at least one of the first edge burner deck portion (1106a) and the second edge burner deck portion (1106b) is arranged on the surface portion (1200) with the double curvature.

19. The gas burner (100) according to claim 1, comprising sheet metal, wherein the sheet metal comprises the surface (102) forming the burner deck (104), wherein a dimension of at least one of the holes (204) of the burner deck (104) is equal to or larger than a thickness (210) of the sheet metal.

20. The gas burner (100) according to claim 1, wherein more than 1.0% of the surface area of the burner deck (104) is formed by a combined surface area of the holes (204).

21. The gas burner (100) according to claim 1, wherein the gas (202) to be combusted comprises at least 70% hydrogen ($H_2$).

22. A heating appliance, comprising:
the gas burner (100) of claim 1;
a gas inlet (902) adapted to provide the gas (202) to the burner deck portions (106) via the holes (204);
an air inlet (904) adapted to provide air to the burner deck portions (106) via the holes (204).

23. The heating appliance of claim 22, comprising a control unit (906) adapted to control the gas inlet (902) and/or the air inlet (904) to control a mixture of the gas (202) and the air before the mixture is at the burner deck portions (106).

* * * * *